United States Patent
Huang

(10) Patent No.: US 10,455,386 B2
(45) Date of Patent: Oct. 22, 2019

(54) CONTROLLING DATA TRANSMISSIONS FOR MACHINE TYPE COMMUNICATIONS IN A MOBILE COMMUNICATION SYSTEM

(71) Applicant: Huawei Technologies Co., Ltd., Shenzhen (CN)

(72) Inventor: Yangcheng Huang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 119 days.

(21) Appl. No.: 15/152,310

(22) Filed: May 11, 2016

(65) Prior Publication Data
US 2016/0255458 A1 Sep. 1, 2016

Related U.S. Application Data

(63) Continuation of application No. PCT/EP2013/073731, filed on Nov. 13, 2013.

(51) Int. Cl.
*H04W 4/70* (2018.01)
*H04W 48/20* (2009.01)
(Continued)

(52) U.S. Cl.
CPC .............. *H04W 4/70* (2018.02); *H04W 48/20* (2013.01); *H04W 72/1252* (2013.01);
(Continued)

(58) Field of Classification Search
CPC ....... H04W 4/005; H04W 4/70; H04W 48/20; H04W 72/1252
See application file for complete search history.

(56) References Cited

U.S. PATENT DOCUMENTS

2002/0083044 A1* 6/2002 Kaplan ............. G06F 17/30905
2008/0076432 A1* 3/2008 Senarath ............... H04W 36/18
455/442
(Continued)

FOREIGN PATENT DOCUMENTS

CN 103250456 A 8/2013
EP 1771023 A1 4/2007
(Continued)

OTHER PUBLICATIONS

"3rd Generation Partnership Project; Technical Specification Group Services and System Aspects; Machine-Type and other mobile data applications Communications enhancements (Release 12)," 3GPP TR 23.887, V1.3.0, pp. 1-153, 3rd Generation Partnership Project, Valbonne, France (Nov. 2013).
(Continued)

*Primary Examiner* — Brandon M Renner
*Assistant Examiner* — Jay L Vogel
(74) *Attorney, Agent, or Firm* — Leydig, Voit & Mayer, Ltd.

(57) ABSTRACT

The invention relates to methods for controlling transmission of machine type communication data to or from machine type communication devices within a mobile communication system. Furthermore, the invention relates to a mobile terminal and network node for implementing such methods, and to implementations of the methods in software. In one aspect of the invention, a mechanism to perform transmission planning (or scheduling) of data transmission from machine type communication devices is suggested. This transmission planning may be based on load estimates at different points in time (e.g. for individual timeslots), and may allow the scheduling of transmissions of machine type communication data at points in time, where the load in the mobile/wireless communication network is expected to be low.

8 Claims, 16 Drawing Sheets

(51) Int. Cl.
H04W 72/12 (2009.01)
H04W 76/12 (2018.01)
H04W 88/08 (2009.01)
H04W 88/02 (2009.01)

(52) U.S. Cl.
CPC .......... H04W 76/12 (2018.02); H04W 88/02 (2013.01); H04W 88/08 (2013.01)

(56) References Cited

U.S. PATENT DOCUMENTS

| | | | |
|---|---|---|---|
| 2012/0017216 A1 | 1/2012 | Chan et al. | |
| 2012/0069869 A1* | 3/2012 | Jeong | H04L 12/40013 375/132 |
| 2012/0094680 A1* | 4/2012 | Stackelius | H04W 72/1242 455/452.1 |
| 2012/0250501 A1* | 10/2012 | Lee | H04W 4/021 370/229 |
| 2012/0250630 A1* | 10/2012 | Paiva | H04W 74/0833 370/329 |
| 2013/0051228 A1 | 2/2013 | Kim et al. | |
| 2013/0163495 A1 | 6/2013 | Lim et al. | |
| 2013/0321347 A1 | 12/2013 | Kim | |
| 2015/0118993 A1* | 4/2015 | Rune | H04W 12/08 455/410 |

FOREIGN PATENT DOCUMENTS

| | | |
|---|---|---|
| WO | WO 2011098992 A1 | 8/2011 |
| WO | WO 2012111993 A2 | 8/2012 |
| WO | WO 2012111998 A2 | 8/2012 |

OTHER PUBLICATIONS

"3rd Generation Partnership Project; Technical Specification Group Services and System Aspects; System improvements for Machine-Type Communications (MTC) (Release 11)," 3GPP TR 23.888, V11.0.0, pp. 1-165, $3^{rd}$ Generation Partnership Project, Valbonne, France (Sep. 2012).

"3rd Generation Partnership Project; Technical Specification Group Services and System Aspects; General Packet Radio Service (GPRS) enhancements for Evolved Universal Terrestrial Radio Access Network (E-UTRAN) access (Release 12)," 3GPP TS 23.401, V12.2.0, pp. 1-293, $3^{rd}$ Generation Partnership Project, Valbonne, France (Sep. 2013).

"3rd Generation Partnership Project; Technical Specification Group Radio Access Network; Radio Resource Control (RRC); Protocol specification (Release 10)," 3GPP TS 25.331, V10.13.0, pp. 1-1898, $3^{rd}$ Generation Partnership Project, Valbonne, France (Sep. 2013).

"3rd Generation Partnership Project; Technical Specification Group Radio Access Network; Study on RAN Improvements for Machine-type Communications; (Release 11)," 3GPP TR 37.868, V11.0.0, pp. 1-28, $3^{rd}$ Generation Partnership Project, Valbonne, France (Sep. 2011).

"3rd Generation Partnership Project; Technical Specification Group GSM/EDGE Radio Access Network; GERAN improvements for Machine-Type Communications (MTC) (Release 12)," 3GPP TR 43.868 V12.0.0, pp. 1-16. $3^{rd}$ Generation Partnership Project, Valbonne, France (Nov. 2012).

"3GPP Enhancements for Machine Type Communications Overview," IEEE WoWMoM 2012 Panel, pp. 1-15, Institute of Electronics and Electrical Engineers, New York, New York (Jun. 25-28, 2012).

Cheng et al., "Overload Control for Machine-Type-Communications in LTE-Advanced System," IEEE Communications Magazine, vol. 50, Issue 5, pp. 38-45, Institute of Electronics and Electrical Engineers, New York, New York (Jun. 2012).

Larmo et al., "RAN overload control for Machine Type Communications in LTE," IEEE Globecom Workshops, pp. 1626-1631, Institute of Electronics and Electrical Engineers, New York, New York (Dec. 3-7, 2012).

Lioumpas et al., "Uplink Scheduling for Machine-to-Machine Communications in LTE-based Cellular Systems," IEEE Globecom Workshops, pp. 353-357, Institute of Electronics and Electrical Engineers, New York, New York (Dec. 5-9, 2011).

Shafiq et al., "A First Look at Cellular Machine-to-Machine Traffic—Large Scale Measurement and Characterization," Sigmetrics '12, London, England (Jun. 11-15, 2012).

* cited by examiner

CONTROLLING DATA TRANSMISSIONS FOR MACHINE TYPE COMMUNICATIONS IN A MOBILE COMMUNICATION SYSTEM

CROSS-REFERENCE TO RELATED APPLICATION

This application is a continuation of International Patent Application No. PCT/EP2013/073731, filed on Nov. 13, 2013, which is hereby incorporated by reference in its entirety.

FIELD OF INVENTION

The invention relates to methods for controlling transmission of machine type communications data to or from machine type communications devices within a mobile communication system. Furthermore, the invention relates to a mobile terminal and network node for implementing such methods, and to implementations of the methods in software.

TECHNICAL BACKGROUND

Long Term Evolution (LTE)

The 3rd Generation Partnership Program (3GPP) standardized a new mobile communication system called Long Term Evolution (LTE). LTE has been designed to meet carrier needs for high speed data and media transport as well as high capacity voice support. The work item specification on Long-Term Evolution (LTE) called Evolved UMTS Terrestrial Radio Access (UTRA) and UMTS Terrestrial Radio Access Network (UTRAN) has been released as Release 8 (LTE Rel. 8).

The LTE system provides packet-based radio access and radio access networks with fully IP-based functionality at low latency and low costs. LTE specifies multiple transmission bandwidths to achieve flexible system deployment. In the downlink, Orthogonal Frequency Division Multiplexing (OFDM) based radio access is used, while single-carrier frequency division multiple access (SC-FDMA) based radio access was adopted in the uplink. Many key packet radio access techniques are employed including multiple-input multiple-output (MIMO) channel transmission techniques, and a highly efficient control signaling structure is achieved in LTE Rel. 8/9.

The frequency spectrum for IMT-Advanced (4G) was decided at the World Radio communication Conference 2007 (WRC-07). IMT-Advanced, which includes LTE-Advanced (also known as LTE-A or LTE Rel. 10), provides a global platform on which to build next generations of interactive mobile services that will provide faster data access, enhanced roaming capabilities, unified messaging and broadband multimedia. The specification of LTE-A introduced enhancements such as carrier aggregation, multi-antenna enhancements and relays (Relay Nodes). The 3GPP specification of LTE-A was finalized in March 2011 and supports peak data rates up to 3.5 GBit/s in the downlink and 1.5 Gbit/s in the uplink. Further, LTE-A introduces support of Self Organizing Networks (SON), Multimedia Broadcast/Multicast Service (MBMS) and Heterogenous Networks (HetNets). Other LTE-A enhancements to LTE include architecture improvements for Home (e)NodeBs (i.e. femtocells), local IP traffic offloading, optimizations for machine-to-machine communications (M2C or MTC), SRVCC enhancements, eMBMS enhancements, etc.

In December 2012, further improvements to LTE-A have been standardized in the 3GPP in LTE-A Rel. 11. With this at present latest release of LTE-A, features like Coordinated Multi-Point transmission/reception (CoMP), Inter-Cell Interference Coordination (ICIC) enhancements, Network Improvements for Machine-Type Communication (NIMTC), etc.

LTE Architecture

FIG. 1 exemplarily shows the architecture of LTE, which equally applies to LTE-A as well. FIG. 2 illustrates the E-UTRAN architecture in more detail. The E-UTRAN comprises the eNodeB (which can be also referred to as a base station). The eNode B provides the E-UTRA user plane (PDCP/RLC/MAC/PHY) and control plane (RRC) protocol terminations towards the user equipment (UE). The eNodeB (eNB) hosts the Physical (PHY), Medium Access Control (MAC), Radio Link Control (RLC), and Packet Data Control Protocol (PDCP) layers that include the functionality of user-plane header-compression and encryption. The eNodeB is also responsible for handling Radio Resource Control (RRC) functionality corresponding to the control plane and also implements several additional management functions including radio resource management, admission control, scheduling, enforcement of negotiated uplink Quality of Service (QoS), cell information broadcast, ciphering/deciphering of user and control plane data, and compression/decompression of downlink/uplink user plane packet headers. The eNodeBs are interconnected with each other by means of the X2 interface.

The eNodeBs are also connected by means of the S1 interface to the EPC (Evolved Packet Core), more specifically to the MME (Mobility Management Entity) by means of the S1-MME and to the Serving Gateway (S-GW) by means of the S1-U. The S1 interface supports a many-to-many relation between MMEs/Serving Gateways and eNodeBs. The S-GW routes and forwards user data packets, while also acting as the mobility anchor for the user plane during inter-eNodeB handovers and as the anchor for mobility between LTE and other 3GPP technologies. The S-GW terminates the S4 interface and relays the traffic between 2G/3G systems (via SGSN) and the PDN GW (P-GW). For idle state UEs, the S-GW terminates the downlink data path and triggers paging when downlink data arrives for the UE. It manages and stores UE contexts, e.g. parameters of the IP bearer service, network internal routing information. It also performs replication of the user traffic in case of lawful interception.

The MME is the key control-node for the LTE access-network. It is responsible for idle mode UE tracking and paging procedure including retransmissions. It is involved in the bearer activation/deactivation process and is also responsible for choosing the S-GW for a UE at the initial attach and at time of intra-LTE handover involving Core Network (CN) node relocation. It is responsible for authenticating the user (by interacting with the HSS). The Non-Access Stratum (NAS) signaling terminates at the MME and it is also responsible for generation and allocation of temporary identities to UEs. It checks the authorization of the UE to camp on the service provider's Public Land Mobile Network (PLMN) and enforces UE roaming restrictions. The MME is the termination point in the network for ciphering/integrity protection for NAS signaling and handles the security key management. Lawful interception of signaling is also supported by the MME. The MME also provides the control plane function for mobility between LTE and 2G/3G access networks with the S3 interface terminating at the MME from the SGSN. The MME also terminates the Sha interface towards the home HSS for roaming UEs.

LTE-A Improvements for Machine Type Communications (MTC)

Machine Type Communications (MTC) refers to communications between machines (typically MTC applications running on a hardware and communicating with each other) through mobile communication networks or other types of networks. In the 3GPP context, a MTC device denotes a UE equipped for machine type communications (sometimes also referred to as MTC UE), which communicates with MTC Server(s) and/or other MTC device(s). A MTC server can be considered an entity, which communicates to MTC devices e.g. through a PLMN.

An example of MTC technology might be a set of devices that monitor traffic in a city and communicate the information to the city's traffic lights in order to regulate the flow of traffic. MTC could be for example used in telemetry, data collection, remote control, robotics, remote monitoring, status tracking, road traffic control, offsite diagnostics and maintenance, security systems, logistic services, fleet management, and telemedicine.

MTC is expanding rapidly and has the potential to generate significant revenues for mobile network operators. MTC Devices are expected to outnumber voice subscribers by at least two orders of magnitude. Some predictions are much higher. MTC can enable machines to communicate directly with one another. MTC communication has the potential to radically change the world around us and the way that people interact with machines.

Machine type communications are expected to be one of the most differentiating technologies and applications in (building) next-generation communications networks (i.e. 5G). In addition to ultra-high network speed and increased maximum throughput (as compared to 4G), 5G technologies are expected to provide efficient support of machine-type devices to enable the Internet of Things with potentially higher numbers of connected devices, as well as novel applications such as mission critical control or traffic safety, requiring reduced latency and enhanced reliability.

3GPP TR 37.868, "RAN Improvements for Machine-type Communications", Version 11.0.0 (available at http://www.3gpp.org) studied the traffic characteristics of different MTC applications with machine-type communications and define new traffic models based on these findings. In this context, radio enhancements for UTRAN and E-UTRAN to improve the support of machine-type communications were also studied.

FIG. 3 illustrates the roaming architecture for 3GPP Architecture for Machine-Type Communication for a so-called home routed scenario, as it is specified in 3GPP TR 23.888, "System improvements for Machine-Type Communications (MTC)", version 11.0.0, (available at http://www.3gpp.org). In a so called Direct Model, the MTC Application communicates with the UE for MTC directly as an over-the-top application on 3GPP network. In this model, as illustrated in FIG. 4, the signaling (control plane) of MTC applications running on UEs or MTC devices located in the E-UTRAN is interfaced by a MTC InterWorking Function (MTC-IWF) which typically resided in the Home-PLMN. As further shown in FIG. 5, the user plane traffic of carrying the MTC data is relayed through the P-GW (optionally via the MTC Server) to the target MTC application (or vice versa). The MTC application may be running on the MTC server or another device inside or outside the home PLMN. An MTC-IWF could be a standalone entity or a functional entity of another network element. The MTC-IWF hides the internal PLMN topology and relays or translates signaling protocols used over MTCsp towards the MTC Server to invoke specific functionality in the PLMN. In the Direct Model, the MTC data is transmitted through the 3GPP network.

The RAN improvements should enable or improve the usage of RAN resources efficiently, and/or reduce the complexity when a large number of machine-type communications devices possibly need to be served based on the existing features as much as possible. Meanwhile, minimize the changes of existing specifications and the impaction of Human-to-Human (H2H) terminals in order to keep the complexity related to M2M optimizations at a minimum level. An overview of MTC enhancement and other enhancement for mobile data applications at the 3GPP for LTE-A (Release 12) is provided in 3GPP 23.887, "Machine-Type and other mobile data applications Communications enhancements", version 1.3.0 (available at http://www.3gpp.org).

PDN Connectivity and MTC

Connectivity for MTC data transmission is based on packet data network (PDN) connectivity. In LTE-A, a PDN connection is an association between an UE and a PDN GW (P-GW). It is represented by one IPv4 address and/or one IPv6 prefix of the UE. As shown in FIG. 3, P-GW is the gateway for MTC data to and from the MTC Server or the UE. Generally, a UE may have simultaneous connectivity with more than one P-GW for accessing multiple packet data networks.

For E-UTRAN access to the EPC, the PDN connectivity service is provided by an EPS bearer between the UE and the P-GW for a GTP-based S5/S8 interface, and by an EPS bearer between UE and S-GW concatenated with IP connectivity between S-GW and P-GW for PMIP-based S5/S8. An EPS bearer uniquely identifies traffic flows that receive a common Quality of Service (QoS) treatment between a UE and a P-GW for GTP-based S5/S8 and between UE and S-GW for PMIP-based S5/S8. The packet filters signaled in the NAS procedures are associated with a unique packet filter identifier on per-PDN connection basis.

One EPS bearer is established when the UE connects to a PDN, and that remains established throughout the lifetime of the PDN connection to provide the UE with always-on IP connectivity to that PDN. That bearer is referred to as the default bearer. Any additional EPS bearer that is established for the same PDN connection is referred to as a dedicated bearer.

An UpLink Traffic Flow Template (UL TFT) is the set of uplink packet filters in a TFT. A DownLink Traffic Flow Template (DL TFT) is the set of downlink packet filters in a TFT. Every dedicated EPS bearer is associated with a TFT. A TFT may be also assigned to the default EPS bearer. The UE uses the UL TFT for mapping traffic to an EPS bearer in the uplink direction. The PCEF (for GTP-based S5/S8) or the BBERF (for PMIP-based S5/S8) uses the DL TFT for mapping traffic to an EPS bearer in the downlink direction.

As illustrated in FIG. 6, traffic flows are mapped onto the corresponding PDN connections using TFTs (Traffic Flow Templates).

PDN connectivity is established through the following procedures:
1. Establish the RRC connection between UE and eNodeB, using RRC connection establishment procedure;

2. If UE is in EMM-IDLE mode, the Service Request procedure is performed before the PDN Connectivity procedure can be initiated;
3. The PDN Connectivity Request procedure is initiated by UE towards MME;
4. PDN connection requests are rejected immediately if any request of the above procedures cannot be accepted by the network.

With the current concept of PDN connectivity, one PDN connection is exclusively used by a particular UE. Accordingly, as shown in FIG. 7, multiple MTC UEs will generate a plurality of different types of PDN connections.

MTC traffic typically exhibits significantly different characteristics from conventional mobile traffic initiated by subscribers, including:
1. Non-interactive: machine initiated traffic; non-real-time; delay tolerant (depending upon application requirements); potentially time-shift-able.
2. Short connectivity duration: sporadic connectivity (i.e. active for traffic for much less time than smart phones; occurring much less frequently).
3. High signaling overhead: disproportional amount of control plane overhead, compared to user plane traffic, for establishing and tearing down short sessions.
4. Dominant uplink traffic volume: much larger ratio of uplink to downlink traffic volume; requiring low latency in uplink; smaller packets in size.
5. Bursty traffic aggregate: synchronized traffic resulting in bursty aggregate signaling traffic/session volumes.
6. Predictable mobility: mobility depending upon types of MTC devices; more predictable mobility for the same type of MTC devices.

Existing radio access networks are mainly designed for continuous data traffics in the downlink, and optimized for high downlink data rate/volume, which in turn makes control signaling overhead manageable. Further, they are mainly designed for instantaneous communications for human initiated at-will connectivity requests, which have to be rejected immediately if network resources (at the time of receiving the requests) cannot satisfy the requests.

In comparison, MTC applications may be expected to be non-interactive, demanding more uplink capacity and introducing disproportional amount of control plane overhead (in establishing and tearing down short sessions). A large number of MTC devices is expected to be deployed in a specific area, thus the network may have to face increased load as well as possible surges of MTC traffic, especially the signaling traffic.

Network congestion including radio network congestion and signaling network congestion (at core nodes) may happen due to mass concurrent data and signaling transmission. This may significantly downgrade network performance and affect quality of experience of smart phone users, leading to dead connections, dropped calls, bad coverage, and intermittent data connectivity.

Mechanisms to guarantee network availability and help network to meet performance requirements under such MTC load have been investigated in the 3GPP. One promising way is to optimize protocols and system design of mobile access networks, based on characteristics of MTC traffic, in order to accommodate large volume of MTC devices in existing networks.

SUMMARY

One object of the invention is to suggest a mechanism allowing mitigation of one or more of the above noted potential problems with machine type communications in a mobile/wireless communication network.

This object is solved by the subject matter of the independent claims. Further advantageous modifications are subject of the dependent claims.

In an aspect of the invention, a mechanism to perform transmission planning (or scheduling) of data transmission from machine type communications devices is suggested. This transmission planning may be based on load estimates at different points in time (e.g. for individual timeslots), and may allow the scheduling of transmissions of machine type communications data at points in time, where the load in the mobile/wireless communication network is expected to be low.

According to an embodiment of this aspect, a network node acts in response to requests for setting up a connection for transmission of machine type communications data that are received from machine type communications devices. Responsive to these requests and based on a load estimate for different points in time (in the future), the network node determines one or more candidate timeslots for a requesting machine type communications device and suggests to this device to resend a transmission request at one or more of these candidate timeslots for transmission of the machine type communications data.

One embodiment of such mechanism according to the before-mentioned aspect of the invention is a method for controlling transmission of machine type communications data to or from machine type communications devices within a mobile communication system. In this method a network node performs the steps outlined below. The network node may be suitable for use in or may be located in the radio access network or in the core network of the mobile communication system. The network node receives a first message in the control plane from a mobile terminal. This first message requests the establishment of a connection between the network node and the mobile terminal (first connection request message), and further comprises an indication that the requesting mobile terminal is a machine type communications device.

The network node further determines one or more timeslots for transmitting the machine type communications data. The determined one or more timeslots are timeslots for which a maximum load count has not been reached. The determination by the network node may be based on load information that indicate the estimated load of the mobile communication system at different future timeslots (or points in time) including the one or more determined timeslots. The network node transmits a first message to the mobile terminal. This first message by the network node informs the mobile terminal on the one or more determined timeslots for transmitting the machine type communications data (first connection setup message). The first message may be transmitted in the control plane of the mobile communication system.

A further embodiment of the method that can be implemented in combination with any other embodiment herein, encompasses an implementation where the network node receives, in response to the first connection setup message and (optionally) in the control plane, another message from the mobile terminal accepting one of the one or more determined timeslots (connection setup complete message). In response to receiving this other message, the network node increases the load count for the accepted one timeslot.

Note that in an alternative implementation, the network node could increase the load count for on the one or more determined timeslots and then, upon receiving, in response to the first connection setup message and in the control plane, a connection setup complete message from the mobile terminal accepting one of the one or more determined timeslots, the network node could again decrease the load count for the non-accepted one or more determined timeslots.

In a further embodiment of the method that can be implemented in combination with any other embodiment herein, the network node further receives at least a part of the load information from an operational support system (OSS) connected to or being part of the mobile communication system.

In another embodiment of the method that can be implemented in combination with any other embodiment herein, the first connection request message comprises at least one of:
- a latency field for indicating the maximum latency for transmitting the machine type communications data;
- a frequency field for indicating the frequency of the transmission of the machine type communications data; and
- a connectivity duration field for indicating an estimated connectivity duration for transmitting the machine type communications data per connection request.

Optionally, the determination of the one or more timeslots by the network node is further based on at least one of the parameters indicated in the fields of the first connection request message.

In another embodiment of the method that can be implemented in combination with any other embodiment herein, the network node receives, upon reaching the point in time of one of the one or more determined timeslots, a second connection request message in the control plane from the mobile terminal. This second connection request message requests the network node to establish a connection for transmitting the machine type communications data. Notably, in case the mobile terminal accepts one of the determine timeslots by sending the before-mentioned connection setup complete message, the point in time of one of the one or more determined timeslots corresponds to the timeslot accepted by the mobile terminal.

In another more detailed exemplary implementation of this embodiment, the second connection request message comprises a scheduled flag. This scheduled flag indicates to the network node that the mobile terminal has been assigned to the one of the one or more determined timeslots previously. Alternatively, the scheduled flag could also be considered to indicate to the network node that it has not to account for the mobile terminal in its load planning, since the requesting mobile terminal has been already accounted in the load planning previously.

In a further exemplary implementation and in response to the reception of the second connection request message, a connection between the mobile terminal and the network node for transmitting the machine type communications data is established.

Moreover, in case of network overload in the mobile communication system upon reception of the second connection request message, no connection between the network node and the mobile terminal may be established. In this case, the network node could for example determine one or more further timeslots for the requesting mobile terminal to transmit the machine type communications data. Again, the further one or more determined timeslots are timeslots for which a maximum load count has not been reached, and the determination may be based on load information that indicate the estimated load of the mobile communication system at different future timeslots including the further one or more determined timeslots.

The network node further transmits, in the control plane and to the mobile terminal, a second connection setup message, which informs the mobile terminal on the one or more further determined timeslots for transmitting the machine type communications data.

In a further exemplary implementation of this embodiment, the network node may receive, in response to the second connection setup message and in the control plane, another connection setup complete message from the mobile terminal accepting one of the further one or more determined timeslots; and may increase the load count for the accepted one timeslot, in response to receiving the other connection setup complete message.

Alternatively, the network node may increase the load count for the further one or more determined timeslots (e.g. before transmitting the second connection setup message or at least before receiving another connection setup complete message). Afterwards the network node may receive, in response to the second connection setup message and in the control plane, another connection setup complete message from the mobile terminal accepting one of the further one or more determined timeslots. In response to receiving the other connection setup complete message the network node then decreases the load count for the non-accepted further one or more determined timeslots.

In a further embodiment of the method that can be implemented in combination with any other embodiment herein, the connection request message(s), the connection setup message(s) are messages of a radio resource control protocol terminated in the network node. In this exemplary embodiment, the network node may be a base station in the radio access network of the mobile communication system.

In an alternative implementation of this embodiment the connection request message(s), the connection setup message(s) are messages of a non-access stratum protocol terminated in the network node. In this exemplary embodiment the network node may be a mobility management entity.

A further embodiment of the aspect of the invention focuses on the operations performed by a mobile terminal. Such exemplary embodiment therefore provides a method for controlling transmission of machine type communications data to or from machine type communications devices within a mobile communication system. In this method, a mobile terminal transmits, in the control plane, a connection request message to a network node in the radio access network or in the core network of the mobile communication system. The connection request message requests the establishment of a connection and indicates that the requesting mobile terminal is a machine type communications device. The mobile terminal further receives, in the control plane and from the network node, a first connection setup message, which informs the mobile terminal on one or more determined timeslots for transmitting the machine type communications data.

The mobile terminal transmits, in response to the first connection setup message and in the control plane, a connection setup complete message to the network node accepting one of the one or more determined timeslots, and upon reaching the point in time of the accepted one timeslot, the mobile terminal transmits in the control plane a second connection request message to the base station to establish a connection for transmitting the machine type communications data.

In a further embodiment of the method that can be implemented in combination with any other embodiment herein, the mobile terminal further checks whether one of the determined one or more timeslots indicated in the first connection setup message allows for transmission of the machine type communications data within maximum latency constraint for transmitting the machine type communications data. If this is the case, the mobile terminal accepts the one of the determined one or more timeslots in the connection setup complete message, and otherwise, the mobile terminal declines the determined one or more timeslots in the connection setup complete message.

In another embodiment of the method that can be implemented in combination with any other embodiment herein, the method comprises establishing, in response to the reception of the second connection request message, a connection between the mobile terminal and the network node for transmitting the machine type communications data.

In a further embodiment of the method that can be implemented in combination with any other embodiment herein, the mobile terminal includes into the first connection request message at least one of:
- a latency field for indicating the maximum latency for transmitting the machine type communications data;
- a frequency field for indicating the frequency of the transmission of the machine type communications data; and
- a connectivity duration field for indicating an estimated connectivity duration for transmitting the machine type communications data per connection request.

Furthermore the methods described in the various exemplary embodiments herein may be implemented into devices.

Accordingly, a further embodiment relates to a network node for controlling transmission of machine type communications data to or from machine type communications devices within a mobile communication system. As noted previously, the network node may be a network node for use in the radio access network or for use in the core network of the mobile communication system. The network node comprises a receiver unit configured to receive a first connection request message in the control plane from a mobile terminal, wherein the first connection request message requests the establishment of a connection between the network node and the mobile terminal, and indicates that the requesting mobile terminal is a machine type communications device. The network node may further comprise a processing unit configured to determine one or more timeslots for transmitting the machine type communications data based on load information that indicate the estimated load of the mobile communication system at different future timeslots including the one or more determined timeslots. The one or more timeslots determined by the processing unit are timeslots for which a maximum load count has not been reached.

Further, the network node comprises a transmitter unit configured to transmit, in the control plane and to the mobile terminal, a first connection setup message, wherein the first connection setup message informs the mobile terminal on the one or more determined timeslots for transmitting the machine type communications data.

The network node may be generally configured to execute any of the methods according to various embodiments performed by a network node as set out in this description.

Furthermore, the network node may be implemented as a base station for use in the radio access network of the mobile communication system, or alternatively as a mobility management entity for use in the core network of the mobile communication system. However, the network node is not limited to these two examples.

Furthermore, another embodiment provides a mobile terminal. This mobile terminal comprises a transmitter unit configured to transmit, in the control plane, a connection request message to a network node in a radio access network or in a core network of the mobile communication system. The connection request message requests the establishment of a connection and indicates that the requesting mobile terminal is a machine type communications device. The mobile terminal further comprises a receiver unit configured to receive, in the control plane and from the network node, a first connection setup message. The first connection setup message informs the mobile terminal on one or more determined timeslots for transmitting the machine type communications data.

The transmitter unit is further configured to transmit, in response to the first connection setup message and in the control plane, a connection setup complete message to the network node accepting one of the one or more determined timeslots. The transmitter unit is also configured to transmit in the control plane and upon reaching the point in time of the accepted one timeslot, a second connection request message to the network node to establish a connection for transmitting the machine type communications data.

In another embodiment of the mobile terminal, the mobile terminal further comprises a processing unit configured to check whether one of the one or more timeslots indicated in the first connection setup message allows for transmission of the machine type communications data within a maximum latency constraint for transmitting the machine type communications data. Moreover, the transmitter unit is configured to indicate an accepted one of the determined one or more timeslots in the connection setup complete message, in case one of the determined one or more timeslots allows for transmission of the machine type communications data within the maximum latency constraint for transmitting the machine type communications data. The transmitter unit is further configured to indicate declining of all determined timeslots in the connection setup complete message, in case none of the determined one or more timeslots allows for transmission of the machine type communications data within the maximum latency constraint for transmitting the machine type communications data.

In a further embodiment of the mobile terminal the transmitter unit is configured to include in the first connection request message at least one of:
- a latency field for indicating the maximum latency for transmitting the machine type communications data;
- a frequency field for indicating the frequency of the transmission of the machine type communications data; and
- a connectivity duration field for indicating an estimated connectivity duration for transmitting the machine type communications data per connection request.

Furthermore, the methods described in the various exemplary embodiments herein may also be implemented in software, for example as software modules or as executable instructions on a suitable storage medium.

In line with this fourth aspect, another embodiment of the invention provides a computer readable medium storing instruction that, when executed by a processor of a network node in the radio access network or in the core network of a mobile communication system, cause the network node to control transmission of machine type communications data to or from machine type communications devices within the mobile communication system, by:

receiving a first connection request message in the control plane from a mobile terminal, wherein the first connection request message requests the establishment of a connection between the network node and the mobile terminal, and indicates that the requesting mobile terminal is a machine type communications device;

determining one or more timeslots for transmitting the machine type communications data, wherein the determined one or more timeslots are timeslots for which a maximum load count has not been reached and the determination is based on load information that indicate the estimated load of the mobile communication system at different future timeslots including the one or more determined timeslots; and transmitting, in the control plane and to the mobile terminal, a first connection setup message, wherein the first connection setup message informs the mobile terminal on the one or more determined timeslots for transmitting the machine type communications data.

The computer readable medium may optionally further store instructions that, when executed by the processor, cause the network node to perform the steps of the method for controlling transmission of machine type communications data to or from machine type communications devices within a mobile communication system according to one of the various embodiments described herein.

Furthermore, another embodiment of the invention provides another computer readable medium storing instruction that, when executed by a processor of a mobile terminal, cause the mobile terminal to perform the steps of:

in the control plane, transmitting a connection request message to a network node in the radio access network or in the core network of a mobile communication system, wherein the connection request message requests the establishment of a connection and indicates that the requesting mobile terminal is a machine type communications device;

receiving, in the control plane and from the network node, a first connection setup message, wherein the first connection setup message informs the mobile terminal on one or more determined timeslots for transmitting the machine type communications data;

transmitting, in response to the first connection setup message and in the control plane, a connection setup complete message to the network node accepting one of the one or more determined timeslots; and upon reaching the point in time of the accepted one timeslot, transmitting a second connection request message to the network node in the control plane to establish a connection for transmitting the machine type communications data.

The computer readable medium may further store instructions that, when executed by the processor, cause the network node to perform the steps of the method for controlling transmission of machine type communications data to or from machine type communications devices within a mobile communication system according to one of the various embodiments described herein.

BRIEF DESCRIPTION OF FIGURES

In the following the invention is described in more detail in reference to the attached figures and drawings. Similar or corresponding details in the figures are marked with the same reference numerals.

DETAILED DESCRIPTION

Figure 1:
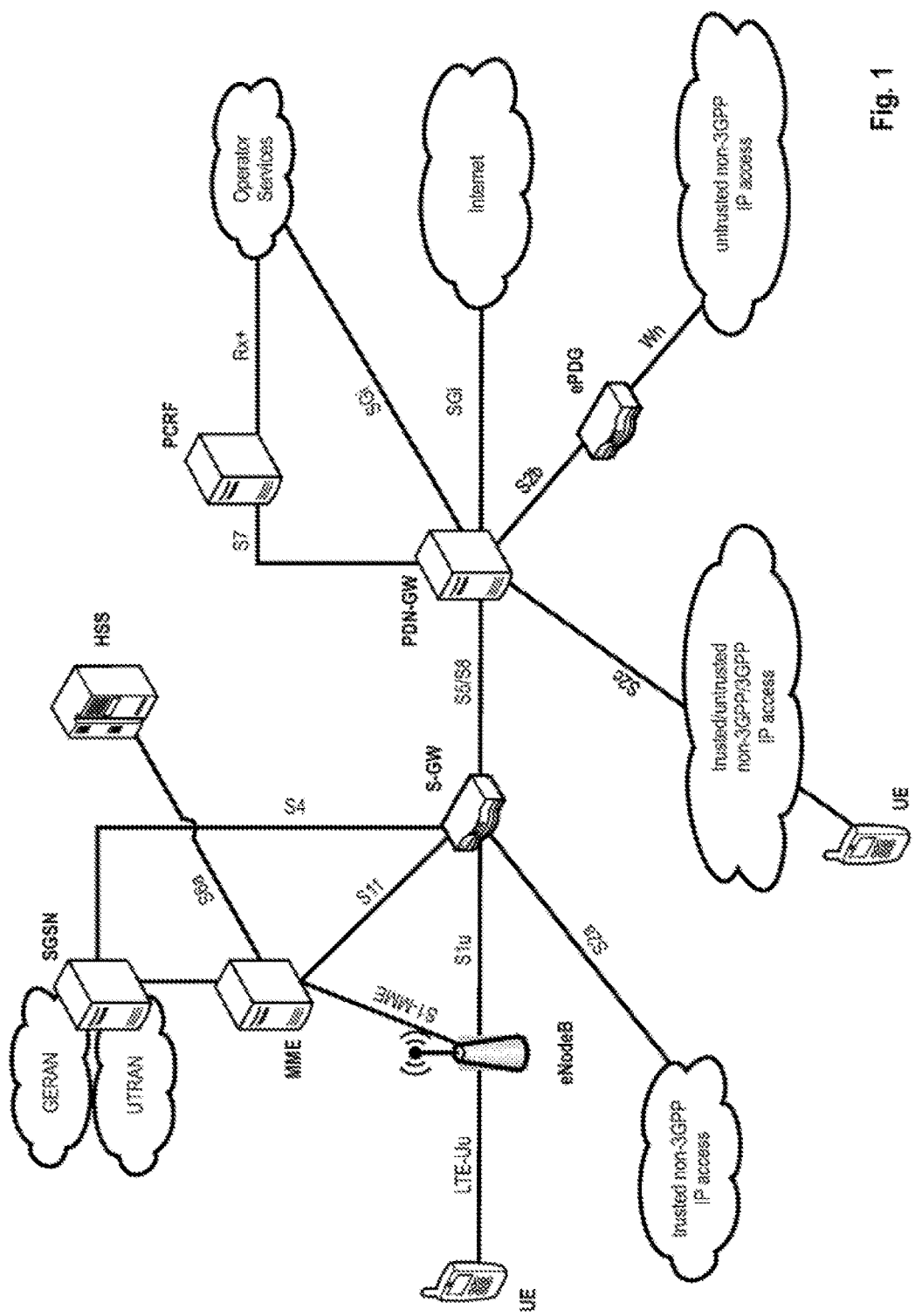
FIG. 1 shows the architecture of an LTE/LTE-A system.
Figure 2:
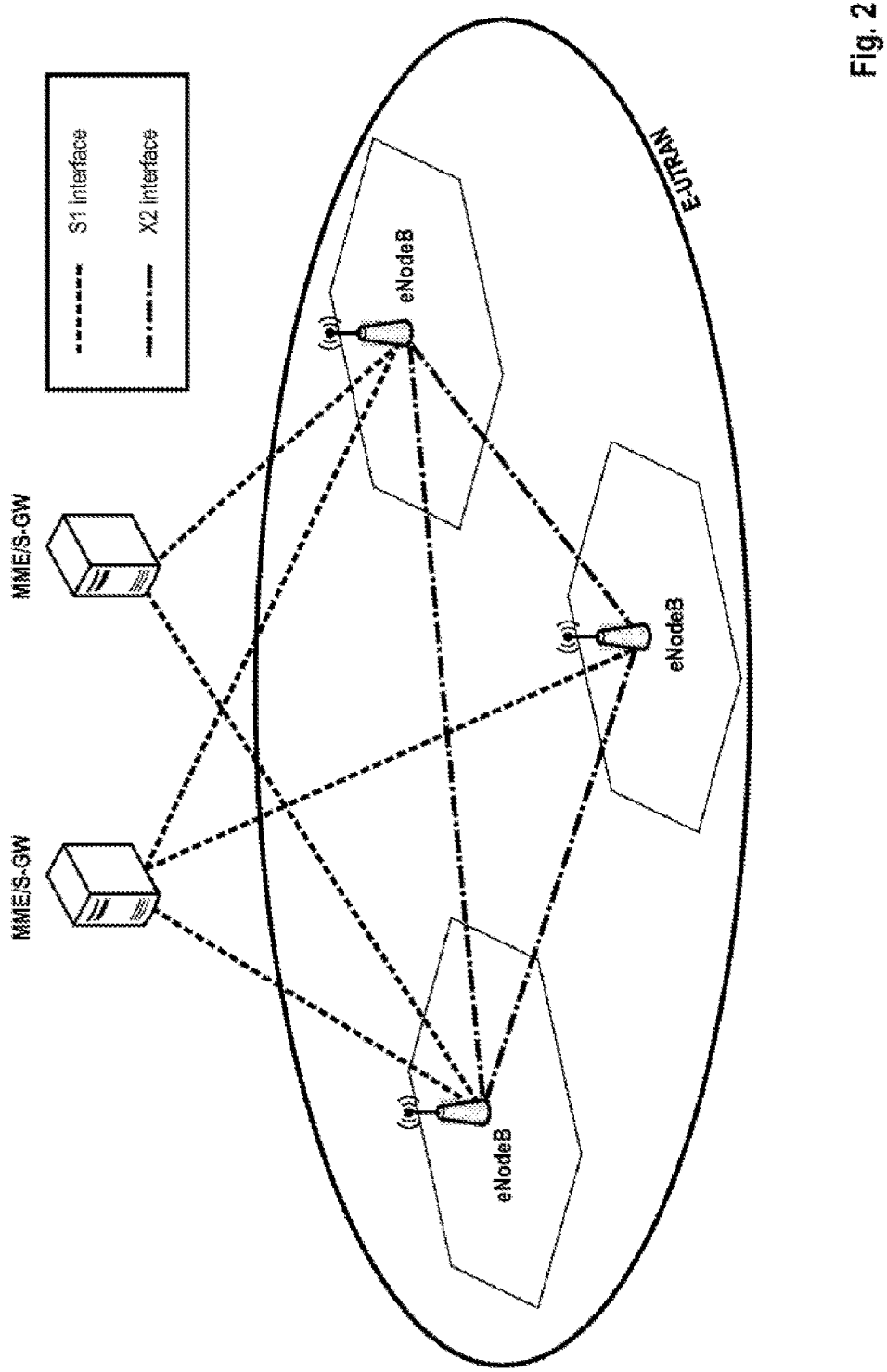
FIG. 2 illustrates the E-UTRAN architecture of the an LTE/LTE-A system.
Figure 3:
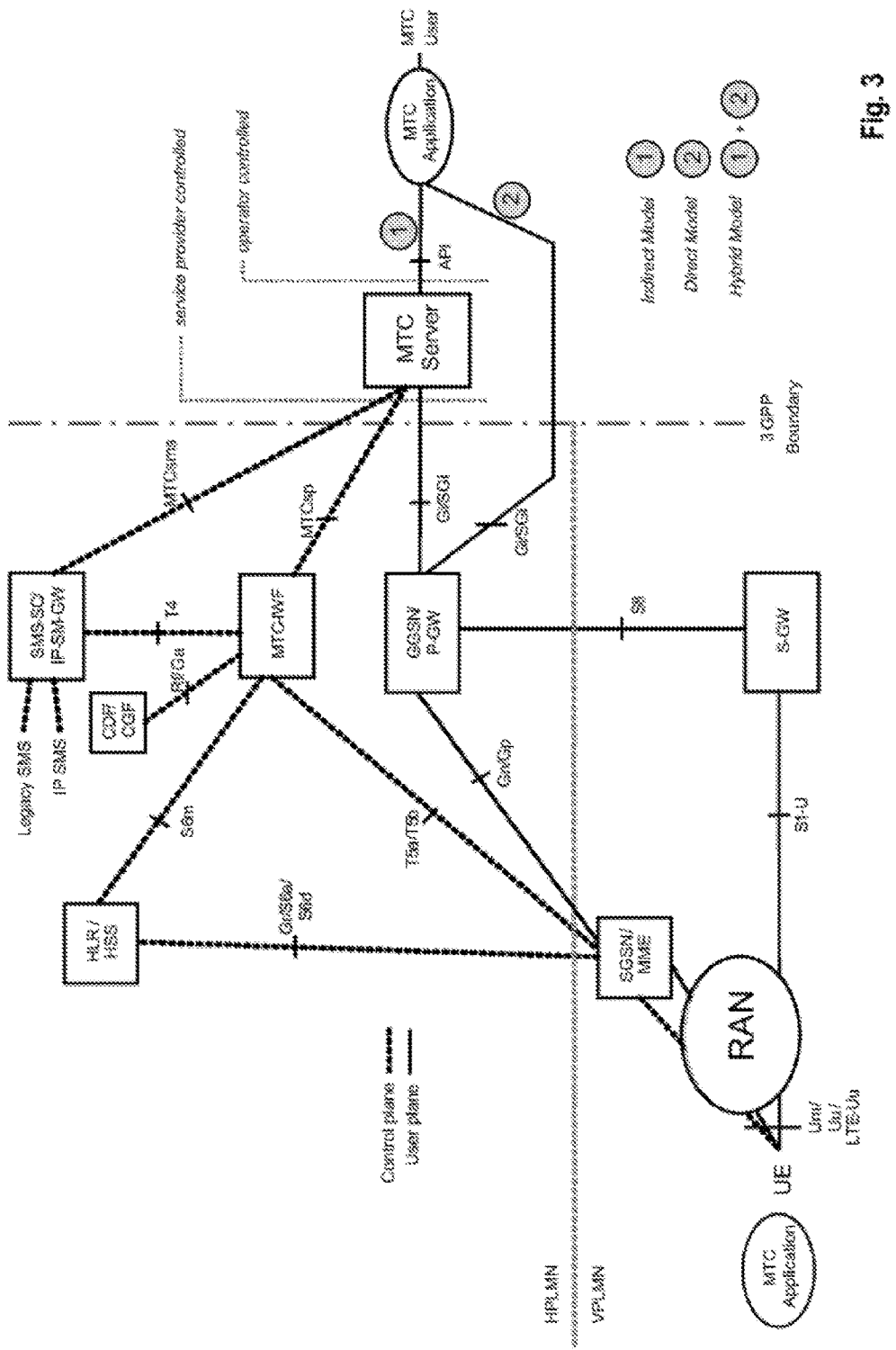
FIG. 3 illustrates the roaming architecture for 3GPP Architecture for Machine-Type Communication for a so-called home routed scenario as specified in 3GPP TR 23.888.
Figure 4:
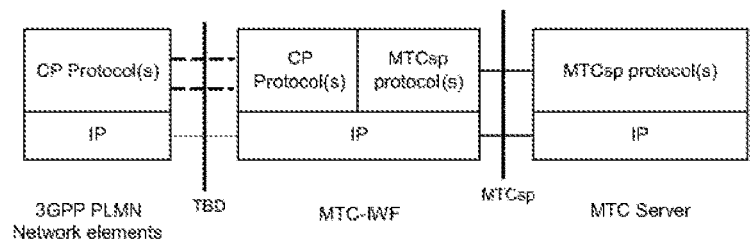
FIG. 4 illustrates the MTCsp protocol stack for machine type communications architecture as specified in 3GPP TR 23.888.
Figure 5:
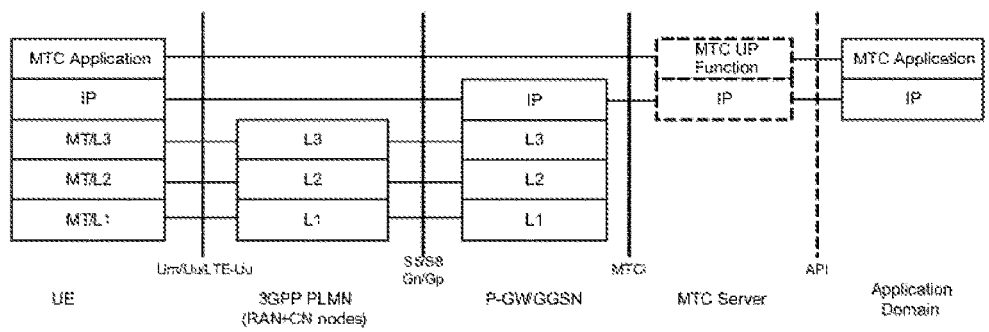
FIG. 5 illustrates the user plane stack for machine type communications architecture as specified in 3GPP TR 23.888, FIG. 6 exemplifies the mapping of different traffic flows onto the corresponding PDN connections using TFTs, FIG. 7 exemplifies the mapping of different traffic flows of multiple UEs onto respective corresponding PDN connections using TFTs.
Figure 6:
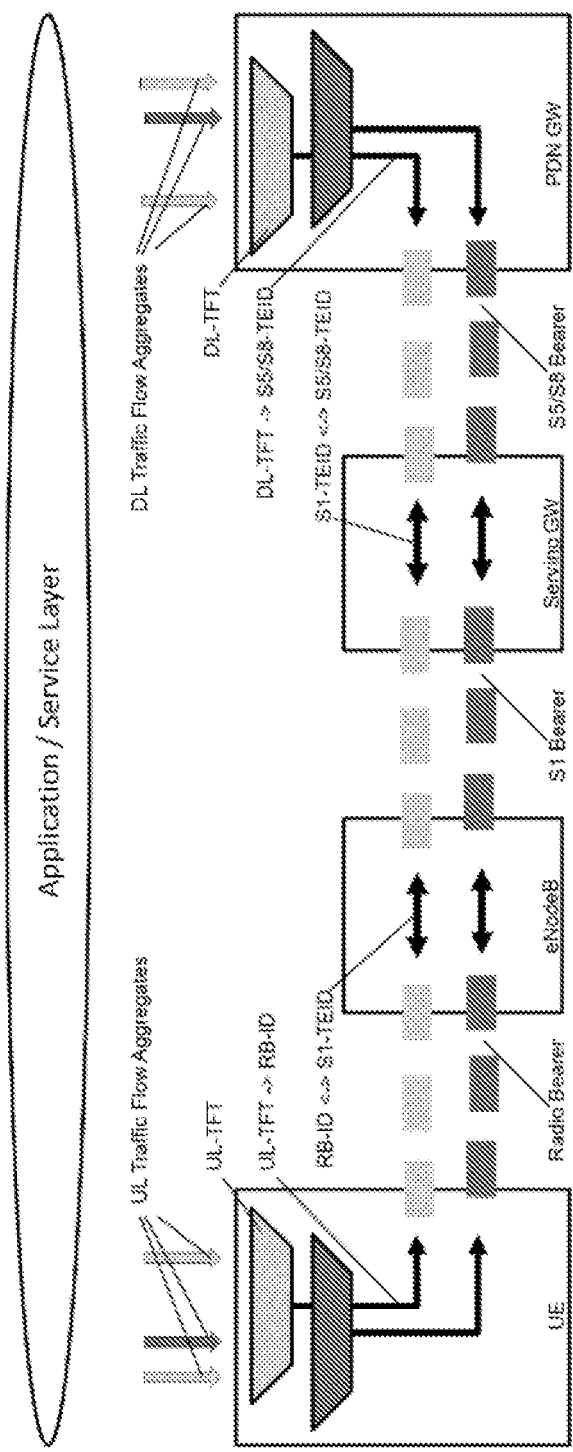
Figure 7:
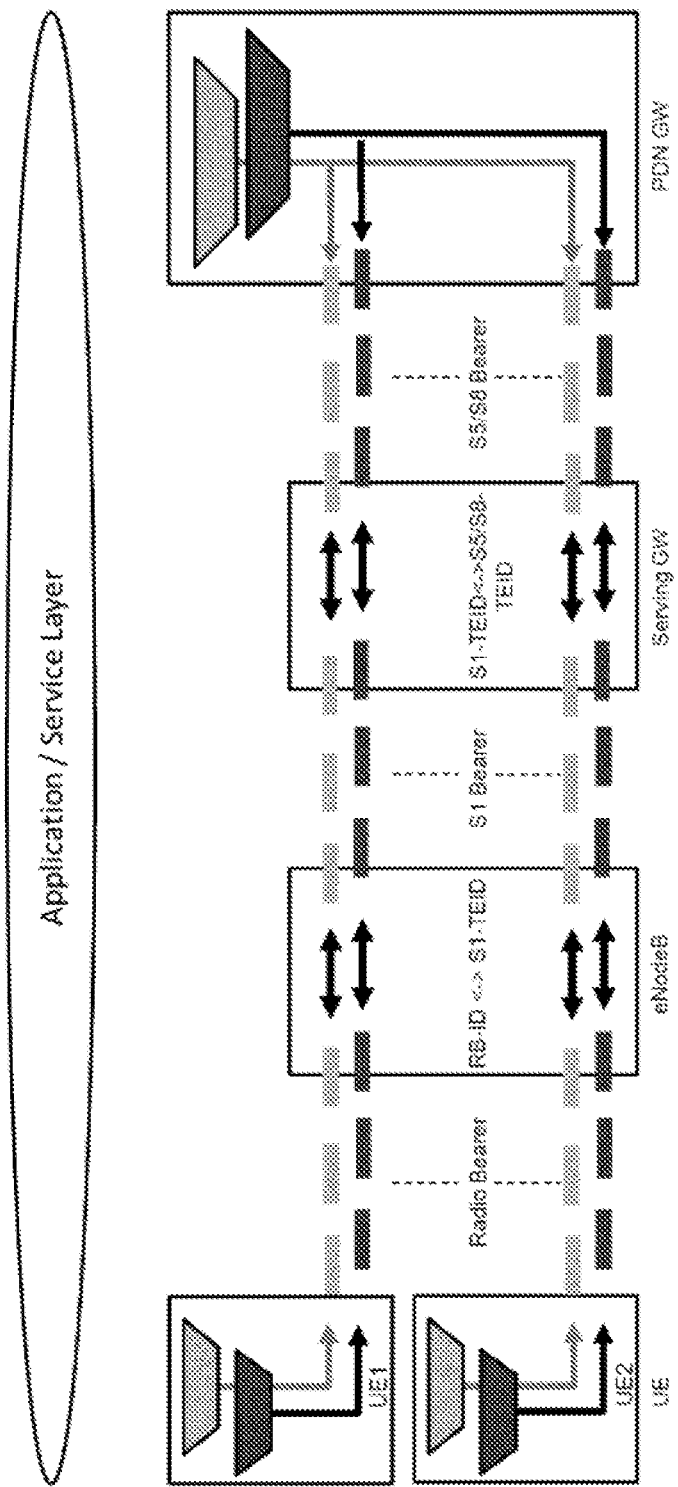

The following paragraphs will describe various embodiments of the different aspects. For exemplary purposes only, most of the embodiments are outlined in relation to an orthogonal single-carrier uplink radio access scheme according to 3GPP LTE (Release 8/9) and LTE-A (Release 11) mobile communication systems, partly discussed in the Technical Background section above. It should be noted that the invention may be advantageously used for example in a mobile communication system such as 3GPP LTE-A (Release 11) communication systems, as described in the Technical Background section above, and beyond, but the invention is not limited to its use in this particular exemplary communication networks. The invention may be broadly used in communication systems where machine type communications is used, including but not limited to radio access networks and/or core networks of wireless systems, like WLAN of the IEEE 802.11 standard family, WiMAX of the IEEE 802.16 family, etc.

As already noted above, in one aspect of the invention, a mechanism to perform transmission planning or scheduling of data transmission from machine type communications (MTC) devices is suggested. In the aspects of the invention, this transmission planning or scheduling of MTC devices, respectively, MTC data transmission may be a high-level transmission planning function which may be independent from the actual physical resource allocation to the mobile terminals. Nonetheless, this high-level transmission planning function may be of course cooperatively coupled to the physical resource allocation (physical resource scheduling), as the algorithms used for physical resource allocation may also take into account parameters provided from the high-level transmission planning algorithm.

This transmission planning may be based on load estimates at different points in time (e.g. for individual timeslots), and may allow the scheduling of transmissions of MTC data at points in time, where the load in the mobile/wireless communication network is expected to be low. In contrast to physical resource allocation, the transmission planning of MTC devices/data may operate on coarser subdivision of the time into timeslots. The timeslots considered by transmission planning may be in the order of several second (e.g. 30 s, 45 s, etc.), or even several minutes (e.g. 1 min, 5 min, 10 min, etc.). Each timeslot may be associated to a load count that indicates the expected load of the mobile communication system within the given timeslot. Note that the selection of the appropriate duration of the timeslots used for transmission planning can be considered to be within the skilled person's knowledge and/or may be influenced by other constraints of the mobile communication system or OSS. Further note that the duration of the timeslots may not be necessarily uniform, but different timeslots of different durations may be considered in transmission planning. The durations may also consider load variations that are typical during the course of the day, so that for example at times, where the estimated load in the network is typically high, the timeslot duration is shorter than at times, where the load is typically low, to thereby allow for a more accurate transmission planning during high load times in the network.

An upper threshold may be defined for the timeslots. If the threshold load level indicated by this threshold is exceeded, the network may be considered overloaded. Of course, multiple intermediate thresholds can be defined that represent different load levels for the given timeslots. These thresholds may also be used for transmission planning to ensure an ideally equally distributed load in the network (e.g. in between two load thresholds). For transmission of MTC data, the transmission planning function may assign timeslots to requesting mobile terminals (e.g. an MTC device or UE) for which the load count yields an acceptably low load which is below the upper congestion threshold.

In another exemplary implementation, the MTC devices could be assigned an upper load threshold for MTC devices (MTC load threshold) which is lower than the (total) upper threshold yielding network congestion. The transmission planning function may ensure that the expected load for MTC data within the timeslots is below this MTC load threshold, i.e. the remaining available load may be reserved for transmissions by other non-MTC applications. The MTC load threshold is not necessarily constant over time, but different MTC load thresholds may be set for different times during a day or week. The MTC load thresholds may for example be set taking into account the expected load by (higher-priority data transmissions of) non-MTC applications (e.g. phone calls, streaming applications, general-purpose Internet connections, emergency calls, etc.), which may vary during a day. It can be for example expected that the MTC load thresholds are higher in the late evening and (may be even higher during) night time, than during daytime.

According to an embodiment a network node implements the load planning mechanism and acts in response to requests for setting up a connection for transmission of MTC data that are received from MTC devices. Responsive to these requests the network node determines one or more candidate timeslots for a requesting MTC device based on a load estimate for different points in time (in the future). Thereupon, the network node suggests to the requesting device to reconnect at one or more of these candidate timeslots for transmission of the MTC data.

Figure 8:
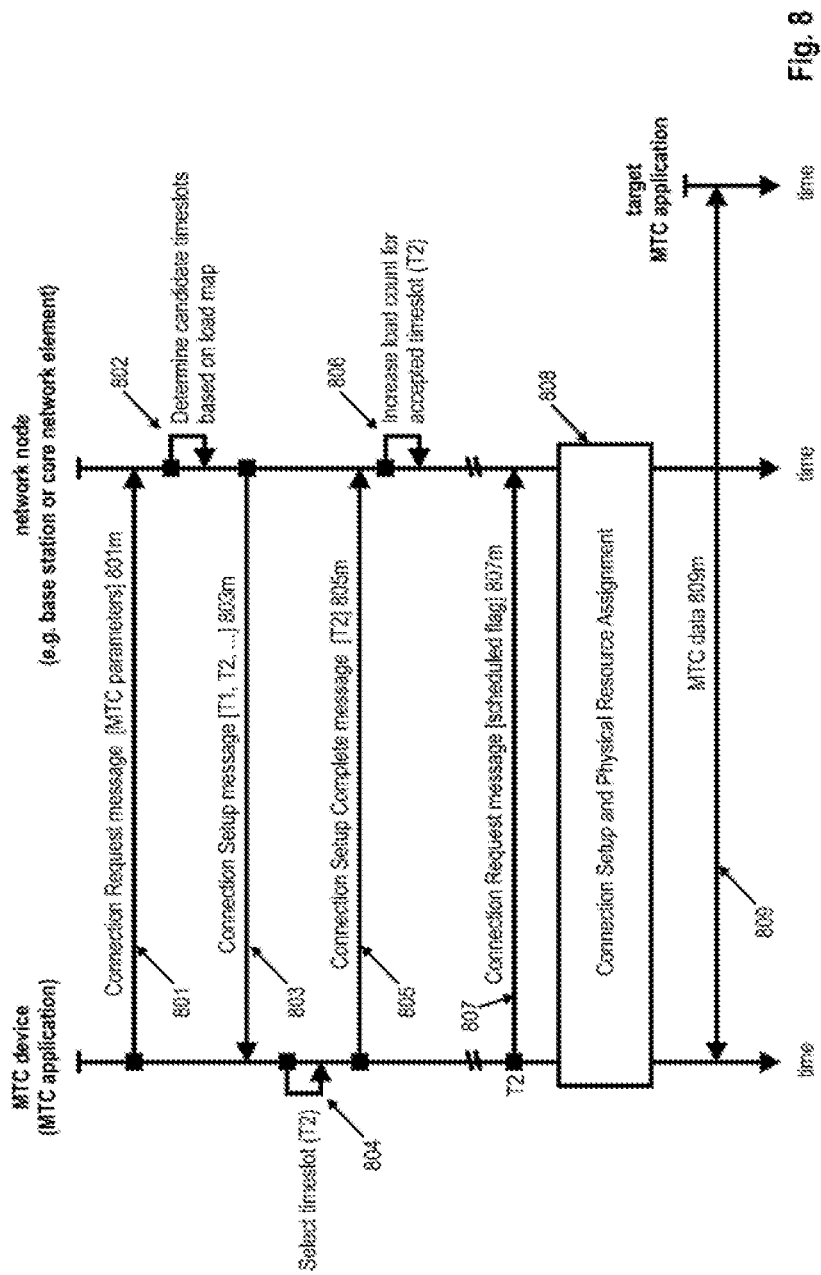
FIG. 8 shows an exemplary flow of messages exchanged between the network node and the mobile terminal (MTC device) for controlling transmission of MTC data according to an exemplary embodiment.

An exemplary flow of messages exchanged between the network node and the mobile terminal (MTC device) according to an embodiment of the invention is shown in FIG. 8. The network node receives 801 a connection request message 801$m$ in the control plane from a mobile terminal. Connection request message 801$m$ requests the establishment of a connection between the network node and the mobile terminal for transmission of MTC data. Furthermore, the connection request message 801$m$ comprises an indication that the requesting mobile terminal is a MTC device. Optionally, the connection request message 801$m$ includes one or more MTC parameters which indicate QoS constraints of the MTC data that is to be transmitted. In one exemplary implementation, the MTC parameters included in the connection request message 801$m$ may comprise at least one parameter selected from: a maximum latency for transmitting the MTC data, a frequency of the transmission of the MTC data, estimated connectivity duration for transmitting the MTC data per connection request, amount of MTC data to be transmitted, and an indication whether the MTC transmission will be (mainly) in uplink, (mainly) in downlink or (essentially) symmetric in uplink and downlink.

The transmission planning function in the network node further determines 802 one or more candidate timeslots (e.g. T1, T2 . . . ) for transmitting the MTC data. The determination by the network node selects timeslot(s) for which a maximum load count has not been reached. For example, the transmission planning function may select timeslot(s) for which the upper load threshold or a MTC load threshold is not reached yet. The determination by the network node may be based on load information that indicates the estimated load of the mobile communication system at different future timeslots (or points in time). The algorithm used for the transmission planning by the network node could be for example select the least loaded timeslots first (least-loaded first), but other algorithms can used as well, such as earliest-available-first (i.e. selecting the earliest available timeslots for the connectivity), round-robin, etc. The invention is not limited to a particular transmission planning algorithm.

Moreover, the network node may further receive at least a part of the load information from an operational support system (OSS) connected to or being part of the mobile communication system (not shown). Optionally, the determination of the timeslot(s) by the network node is further based on at least one of the MTC parameters indicated in the connection request message 801$m$. This can ensure that timeslots that allow the transmission of MTC data within the QoS constraints associated thereto are suggested to the mobile terminal.

Upon having determined the candidate timeslot(s) (T1, T2 . . . ) for the requesting mobile terminal, the network node transmits 803 a connection setup message 803$m$ (which could also be denoted connection delay message) to the mobile terminal. The connection setup message 803$m$ may be transmitted in the control plane of the mobile communication system. The connection setup message 803m comprises the one or more candidate timeslots (T1, T2 . . . ) determined in step 802 for transmission of the MTC data by the requesting mobile terminal, thereby informing the mobile terminal on the one or more timeslots for transmitting the MTC data. Optionally, in case the network node is not able to determine any candidate timeslot for the mobile terminal, it may send a connection rejection message back to the mobile terminal to terminate the connections setup.

The mobile terminal further checks 804 whether one of the determined timeslot(s) indicated in the connection setup message 803m allows for transmission of the MTC data within QoS constraints (e.g. a maximum latency constraint) for transmitting the MTC data. If this is the case, the mobile terminal accepts the one of the determined timeslot(s) by transmitting 805 a connection setup complete message 805m to the network node; otherwise, the mobile terminal declines the determined timeslot(s) (not shown in FIG. 8). Note that in an alternative exemplary implementation, the network node may ensure that the determined timeslots communicated to the mobile terminal meet the QoS constraints for the MTC data. In this case, the checking 802 against the QoS constraints by the mobile terminal is optional, and the mobile terminal only accepts one of the determined timeslot(s).

As described, in the case in which the checking 802 is successful, the mobile terminal transmits 805 the connection setup complete message 805m to the network node accepting one of the one or more determined timeslots (in the example shown in FIG. 8, the timeslot T2). The accepted timeslot (T2) is indicated in the connection setup complete message 805m. Optionally, if no timeslot is accepted by the mobile terminal, the connection setup complete message may comprise a corresponding indication, e.g. no timeslot is indicated in the message, whereupon the procedure continues at step 802 with the network node determining alternative candidate timeslot(s).

The network node receives the connection setup complete message from the mobile terminal. In response to receiving the connection setup complete message, the network node increases 806 the load count for the accepted one timeslot (T2) by an increment, thereby accounting for the load that is expected to be imposed by the mobile terminal when transmitting its MTC data in this timeslot (T2). In implementations, where the mobile terminal indicates in the connection request message 801m whether the MTC transmission will be (mainly) in uplink, (mainly) in downlink or (essentially) symmetric in uplink and downlink, a load count could be maintained for uplink and downlink separately. If the MTC data is mainly involving uplink data, the uplink load count for the timeslot is increased. If the MTC data is mainly involving downlink data, the downlink load count for the timeslot is increased. If the MTC data is symmetric, the uplink load count and downlink load count may be both increased.

Note that the estimated load for some timeslot is represented by its load count. The load count can be implemented in different fashions and the following examples are not considered limiting. In a simple exemplary implementation, the load count is a simple counter, and the (MTC) load thresholds may be simply defined by corresponding counter values. In a very simple implementation, the load counter for a timeslot is incremented, in case a mobile terminal accepts MTC data transmission within this timeslot. The increment can be +1 for each mobile terminal that is expected to send data in the timeslot, or the increment may be determined by the network node based on the amount of MTC data to be transmitted from or to the mobile terminal (in this time slot). If the increment is +1, the load count may be implemented as a MTC device count, i.e. a counter value indicating the number of MTC devices to transmit data in the given timeslot. In this case the upper threshold may be defining a maximum MTC device number that is allowed to communicate MTC data in the given timeslot.

Alternatively, the load count could also be represented by an amount of data transmission of which is expected in the given timeslot. In this alternative implementation the (MTC) load thresholds may be simply defined by different amounts of data. In this alternative, the increment may add the amount of MTC data that is expected to be transmitted to or from the requesting mobile terminal in the given timeslot. In implementations, where the mobile terminal indicates in the connection request message 801m the amount(s) of data to be transmitted and whether the MTC transmission will be (mainly) in uplink, (mainly) in downlink or (essentially) symmetric in uplink and downlink, the respective uplink and downlink load counts may be incremented accordingly.

In another alternative implementation, the load count could also be represented by an amount of data transmission of which is expected in the given timeslot divided by the duration of the timeslot, which can be considered an average data rate of the timeslot. In this implementation the (MTC) load thresholds may be simply defined by different data rates. The increment may add the amount of MTC data that is expected to be transmitted to or from the requesting mobile terminal in the given timeslot divided by the duration of the timeslot.

In FIG. 8, the network node increases the load count in response to receiving the connection setup complete message 805m (which can also be denoted connection delay confirmation message). In an alternative implementation, the network node could increase the load count for on the one or more determined timeslots (e.g. directly after determining 802 of the timeslots but at least before receiving 805 of the connection setup complete message 805m). Then, upon receiving 805 the connection setup complete message 805m from the mobile terminal the network node decreases again the load count for the non-accepted one or more determined timeslots (e.g. for all determined time slots except the accepted one time slot T2). Furthermore, the network node may further decrease the load count for all of the one or more determined timeslots, when it does not receive the connection setup complete message 805m within a given time span.

Upon reaching the point in time of the accepted one timeslot (T2), the mobile terminal transmits 807 in the control plane another connection request message 807m to the network node to establish a connection for transmitting the MTC data. The connection request message 807m requests the network node to establish a connection for transmitting the MTC data. In one exemplary implementation, the second connection request message may comprise a scheduled flag. This scheduled flag indicates to the network node that the mobile terminal has been assigned to a timeslot (e.g. to the time slot T2) previously. Alternatively, the scheduled flag could also be considered to indicate to the network node that it has not to account for the mobile terminal in its load planning, since the requesting mobile terminal has been already accounted in the load planning previously.

Accordingly, the network node does not need to consider the mobile terminal in load planning, but may continue with a connection setup and optionally physical resource assignment 808 for the transmission 809 of the MTC data 809m between the MTC application on the mobile terminal and a target MTC application. The connection setup 808 may include the establishment of bearer services in the radio access network and/or core network of the mobile communication system which are used to convey the MTC data between the MTC applications.

In FIG. 8 it can be assumed for exemplary purposes that the network load at the time (timeslot T2) of the mobile terminal reconnecting to the network allows for setting up a connection and the transmission of the MTC data. However, there may be cases, e.g. a network overload in the mobile communication system, where no connection between the network node and the mobile terminal may be established at the time (timeslot T2) of the mobile terminal reconnecting to the network.

Figure 9:
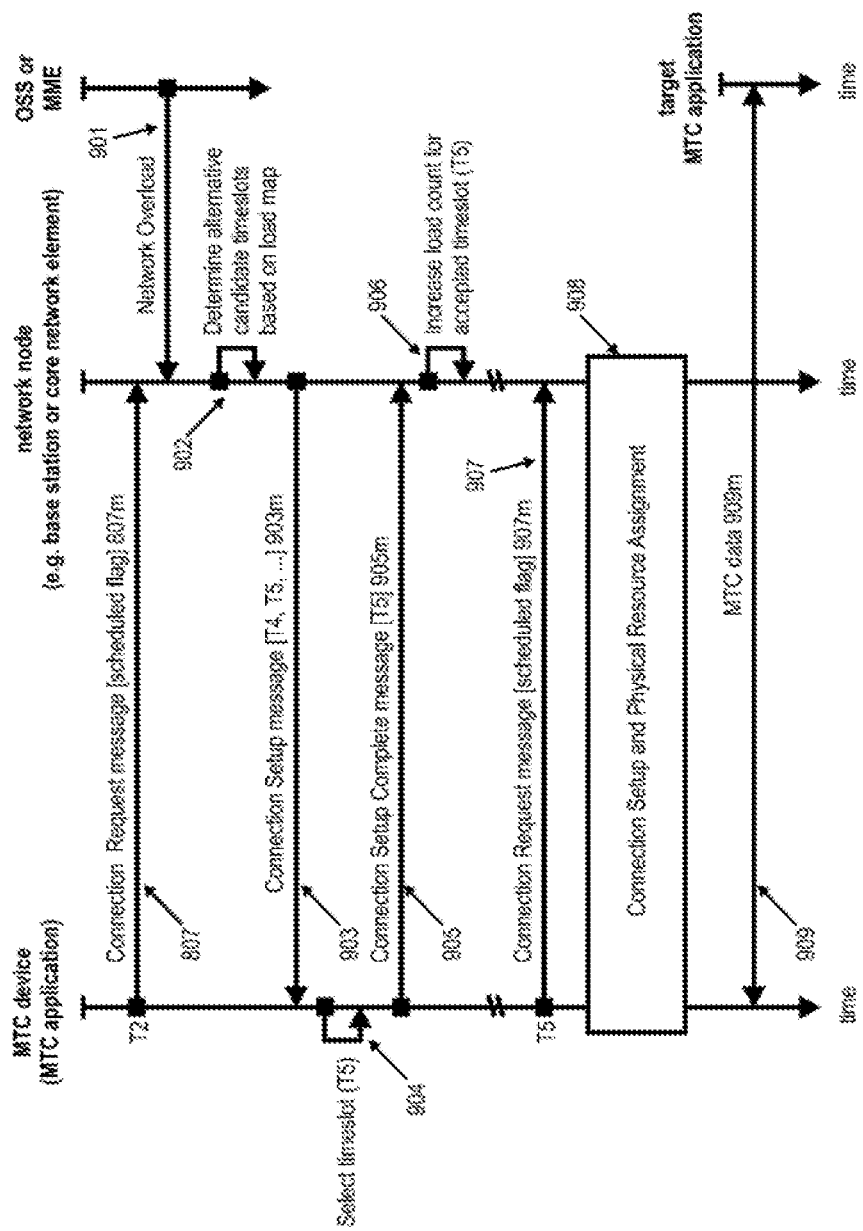
FIG. 9 shows an exemplary flow of messages exchanged between the network node and the mobile terminal (MTC device) according to an exemplary embodiment, for a case where no connection can be established upon the mobile terminal reconnecting to the network.

FIG. 9 shows an exemplary flow of messages exchanged between the network node and the mobile terminal (MTC device) according to an exemplary embodiment, for a case where no connection can be established upon the mobile terminal reconnecting to the network.

Note that message 807m in FIG. 9 corresponds to message 807m in FIG. 8. Furthermore, the "steps" denoted with reference numerals 902-909 of FIG. 9 are similar to the "steps" denoted with reference numerals 802-809 in FIG. 8, except for them being performed in response to the reception of connection request message 807m.

The network node may be informed 901 on network congestion by OSS, so that the mobile node would typically reject the connection request transmitted in step 807 by the mobile terminal. Note that indications on network congestions (or load status information in general) may not only be provided by OSS, but there may also be other functions residing in an element of the mobile communication network, e.g. a radio admission control (RAC) that may be implemented in a mobility management entity (MME) of the core network, which can send load information and/or overload indications to the network node.

In this case, the network node determines 902 one or more alternative timeslots (T4, T5 . . . ) for the requesting mobile terminal to transmit the MTC data. The network node further transmits 903 a connection setup message 903m (which could also be referred to as a connection delay message) in the control plane to the mobile terminal to inform the mobile terminal on the alternative timeslot(s) for transmitting the MTC data. As already described in connection with FIG. 8 before, the mobile terminal accepts one of the alternative timeslots (in this example timeslot T5) and indicates in the control plane this selected timeslot (T5) to the network node by transmitting the a connection setup complete message 905m to the network node. The network node receives the connection setup complete message 905m (which can also be referred to as a connection delay confirmation message) from the mobile terminal and increases 906 the load count for the accepted one timeslot (T5 in the example).

At the point of time of the accepted one timeslot (T5) the mobile terminal transmits 907 a (further) connection request message 907m to the network node, requesting the network node to establish a connection for transmitting MTC data 909m. The second connection request message 907m may comprise a scheduled flag which indicates to the network node that the mobile terminal has been assigned to a timeslot (in this case to timeslot T5) previously. It is not necessary to indicate to which timeslot the mobile terminal has been assigned, as the mobile terminal transmits the connection request message 907m (only) in its assigned time slot. Accordingly, the network node does not need to consider the mobile terminal in load planning, but may for example continue with a connection setup and optionally physical resource assignment 908 for the transmission 909 of the MTC data 909m between the MC application on the mobile terminal and a target MTC application.

Notably, if the network is (again) overloaded upon receiving the further connection setup request message 907m at the accepted one timeslot (T5), the "steps" containing the reference numerals 901-907 may be reiterated. This is however optional.

Next a more specific implementation of aspects of the invention in a 3GPP LTE-A based mobile communication system will be discussed. In one exemplary embodiment, the network node may be implemented in a base station, called an eNodeB in the LTE architecture. The eNodeB terminates the Radio Resource Control (RRC) on the RAN side towards the UEs (e.g. MTC device).

Figure 10:
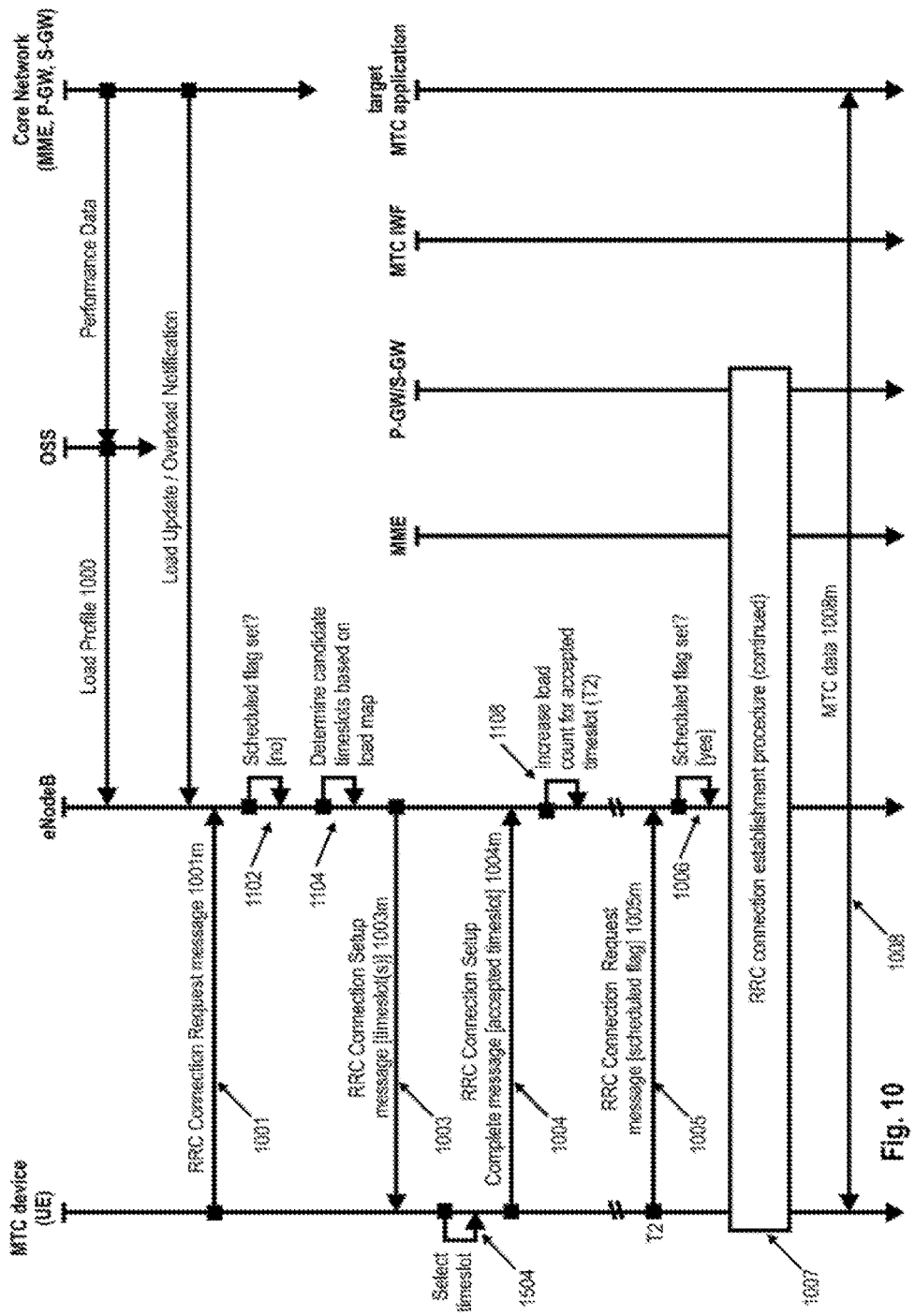
FIG. 10 shows an exemplary flow of a RRC connection establishment procedure between a base station (eNodeB) and an MTC device for controlling transmission of MTC data according to an exemplary embodiment.
Figure 11:
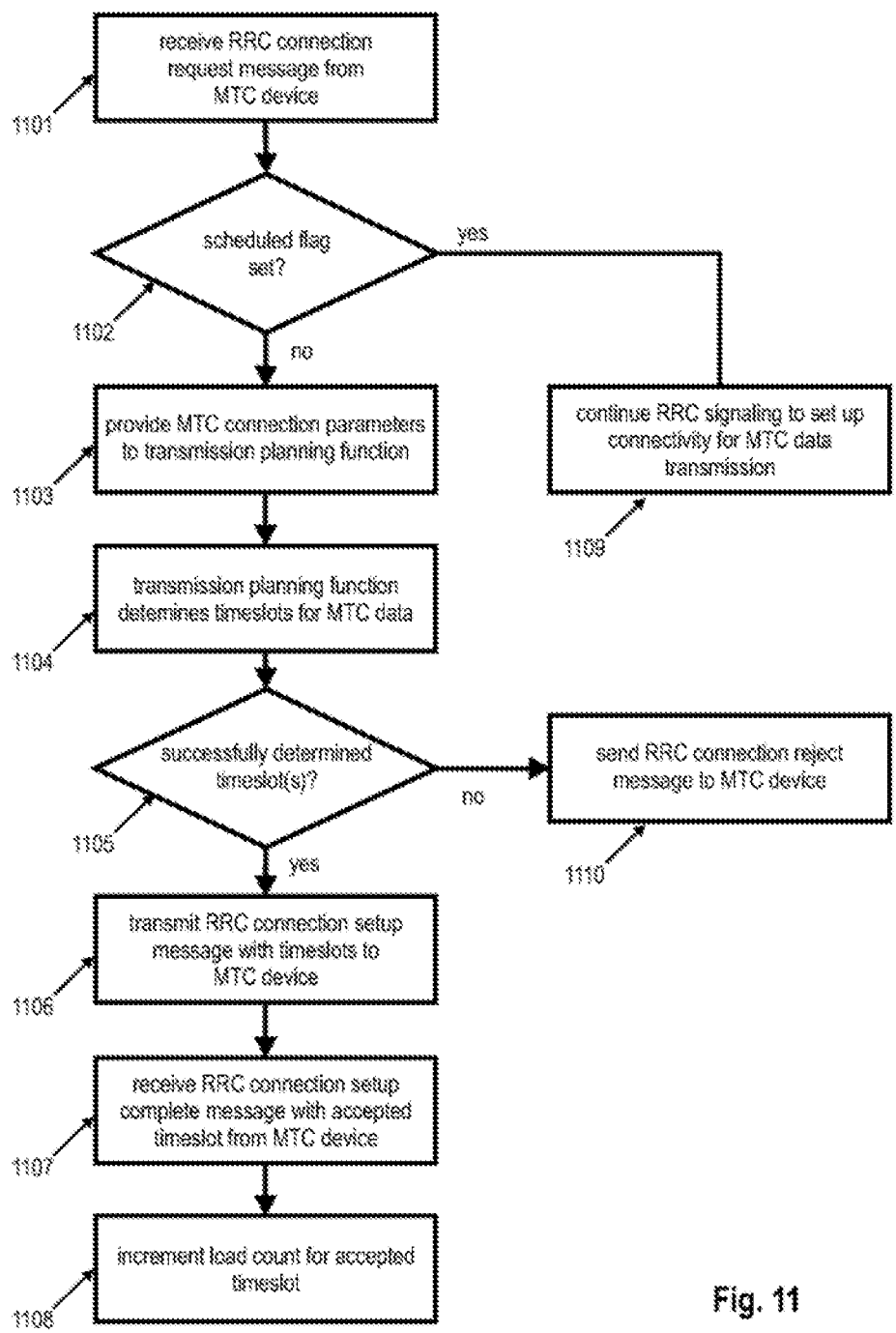
FIG. 11 to FIG. 14 show flow charts for operating a base station (eNodeB) according to different exemplary embodiments.
Figure 15:
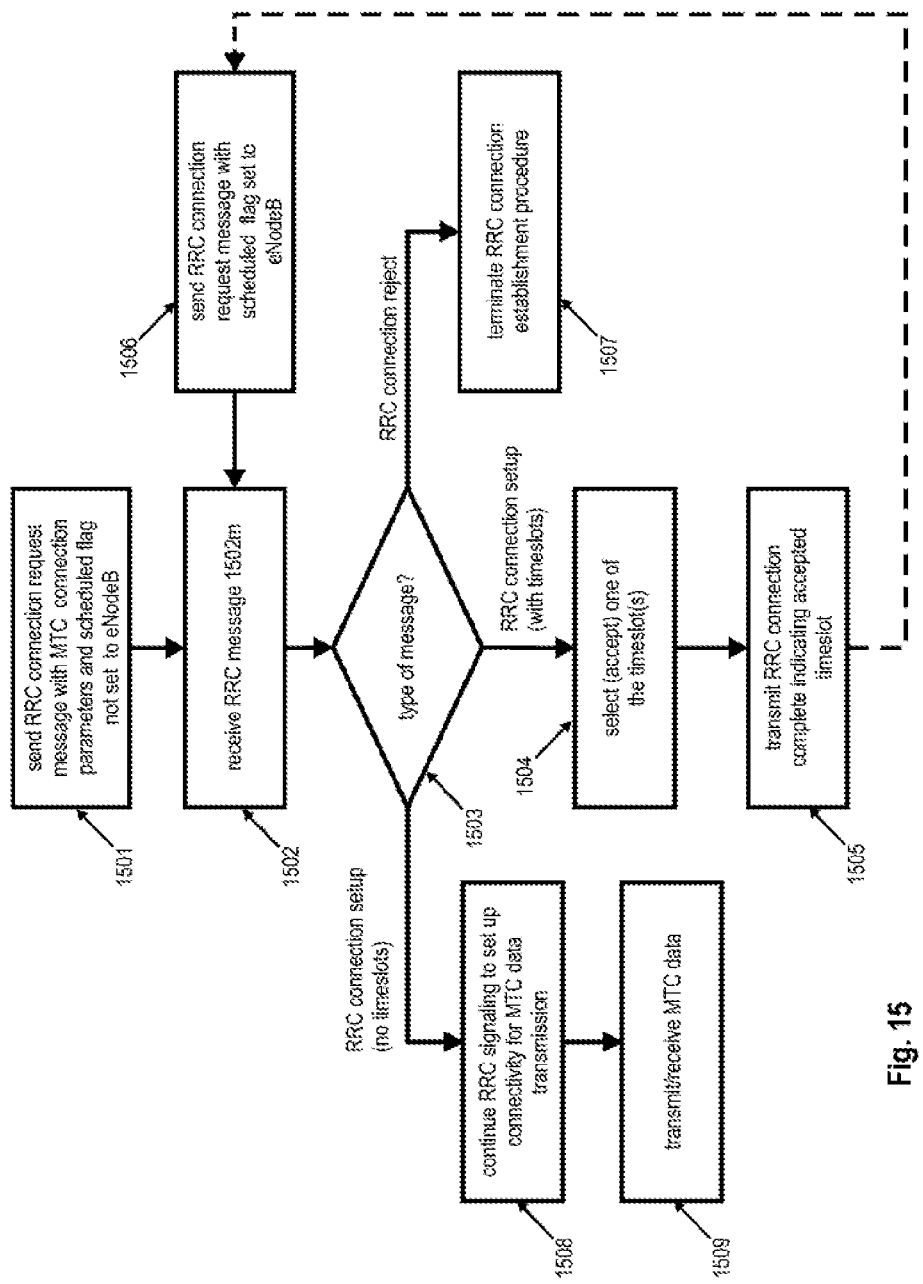
FIG. 15 shows a flow chart for operating a mobile terminal according to an exemplary embodiment.

FIG. 10 shows an exemplary modified RRC connection establishment procedure according to an exemplary embodiment. FIG. 11 and FIG. 15 show exemplary flow charts of the operation of the eNodeB (FIG. 11) and the MTC device (FIG. 15) in this modified RRC connection establishment procedure according to an exemplary embodiment. Note that those operations having the same reference numerals as in FIG. 8 are identical to the respective operations described in connection to FIG. 8 above. The RRC connection establishment procedure is based on the RRC connection establishment defined in section 5.3.3 of 3GPP TS 36.331, "Radio Resource Control (RRC); Protocol specification", version 11.5, which is incorporated herein by reference, and the relevant RRC message structures are shown in section 6.2.2. For simplicity, the following mainly focuses on discussing the modifications to procedures and the messages exchanged during the RRC connection establishment as known from 3GPP TS 36.331.

Referring to FIGS. 10 and 15, the MTC device first sends 1001 (FIG. 10), 1501 (FIG. 15) a RRC connection request message 1001m (which can be compared to the connection request message 801m) to the eNodeB (the network node). The RRC connection request message 1001m indicates to the eNodeB that the requesting UE (the MTC device) requests a connection for MTC data.

This indication may be provided in different fashions. For example, in one implementation a UE identifier (e.g. S-TMSI) comprised in the RRC connection request message 1001m may allow the eNodeB to recognize the UE to be a MTC device. Upon reception of the RRC connection request message 1001m the eNodeB checks the UE identifier in the message 1001m and if it corresponds to the UE identifier of a MTC device, the eNodeB will perform the modified RRC connection establishment procedure as shown in FIG. 10. Otherwise, the eNodeB may perform a conventional RRC procedure.

In another exemplary implementation, the RRC connection request message 1001m does not only indicate that the UE is a MTC device, but it includes further parameters or characteristics of MTC connection (MTC connection parameters). Therese further parameters or characteristics may facilitate a more accurate transmission planning.

One optional field that may be comprised in the RRC connection request message 1001m is a field indicating the maximum acceptable delay the MTC application can tolerate for the connectivity (ACCEPTABLE_LATENCY). This latency may either be provided by MTC application/service providers, or defined in MTC applications with default values. Merely for exemplary purposes, this field could for example indicate 0, i.e. no latency, for time critical MTC applications such as home security; 30 minutes or 1 hour, for applications allowing some latency, but are time critical to some extent, such as medical sensors; or 24 hours, for non-time critical applications, such as electricity/water/gas meters.

Another optional field that may be included in the RRC connection request message 1001m is a field that indicates the periodicity of the MTC data, i.e. at which frequency MTC data need to be transmitted by the MTC application.

procedure is carried out by the eNodeB, without passing the request to the transmission planning algorithm. Note that for the RRC connection request message 1001m as shown in FIG. 10 the scheduled flag would not be set, since this is the first connection request by the MTC device.

One exemplary implementation of the RRC connection request message 1001m is represented by the following ASN.1 syntax:

```
RRCConnectionRequest ::=       SEQUENCE {
    criticalExtensions CHOICE {
        rrcConnectionRequest-r8
        RRCConnectionRequest-r8-IEs,
        criticalExtensionsFuture
        criticalExtensionsFuture-IEs
    }
}
RRCConnectionRequest-r8-IEs ::= SEQUENCE {
    Ue-Identity              InitialUE-Identity,
    establishmentCause       EstablishmentCause,
    spare                    BIT STRING (SIZE (1))
}
InitialUE-Identity ::=       CHOICE {
    s-TMSI                   S-TMSI,
    randomValue              BIT STRING (SIZE (40))
}
EstablishmentCause ::=       ENUMERATED {
    emergency, highPriorityAccess, mt-Acces,
mo-Signaliing, mo-Data, delayTolerantAcces-v1020,
spare2, spare1}
criticalExtensionFuture-IEs ::=       SEQUENCE {
    mtcExtension       mtcExtension-IEs,
}
mtcExtension-IEs::=          SEQUENCE {
    scheduledBit             BOOLEAN       OPTIONAL,
    mtcApplicationRequirements    mtcApplicationRequirement-IEs OPTIONAL,
}
mtcApplicationRequirements-IEs ::=   SEQUENCE {
    acceptableLatency        INTEGER       OPTIONAL,
    connectivityFreq         INTEGER       OPTIONAL,
    connectivityDuration     INTEGER       OPTIONAL,
    dataAmount               INTEGER       OPTIONAL,
    mtcDirection             MtcDirection  OPTIONAL
}
MtcDirection ::=             ENUMERATED {
    mtcUplink, mtcDownlink, mtcSymmetric}
```

For example, such indication could inform the eNodeB whether the connectivity is requested is daily, monthly or on-demand.

A further optional field in the RRC connection request message 1001m may be the expected connectivity duration per request. Alternatively or in addition, the RRC connection request message 1001m could also indicate the amount of data that is to be transmitted by the MTC applications.

Another optional field in the RRC connection request message 1001m could be an indication whether the MTC data will be primarily transmitted in the uplink (i.e. the MTC device will send mainly data) or downlink (i.e. the MTC device will download data), or whether the MTC data will be sent in uplink and downlink in an essentially symmetric fashion. As noted previously, with this indication being present in the RRC connection request message 1001m the eNodeB could independently consider uplink load and downlink load in the transmission planning.

Furthermore, another field which may be present in the RRC connection request message 1001m is a scheduled flag, which indicates whether the requested connectivity has already been scheduled by the eNodeB before or not. If this bit is set, the request is accepted and—if the network is not overloaded—a conventional RRC connection establishment Note that in an alternative implementation, the parameters dataAmount and mtcDirection are not defined in the mtcApplicationRequirements-IEs.

Referring to FIG. 11, upon reception 1101 of the RRC connection request message 1001m at the eNodeB, the eNodeB first checks 1102 whether or not the scheduled flag (e.g. a single bit) has already been set by the requesting MTC device. If the bit is set, which means the MTC device requested connectivity before and has already been considered in transmission planning, the eNodeB does not have to perform transmission planning for this MTC device again and the eNodeB proceeds further with RRC signaling procedures 1109 to assign physical resources to the MTC device for transmission of the MTC data (assuming that there is no overload situation).

If the scheduled flag (the bit) is not set, the eNodeB provides the MTC application requirements in the RRC connection request message 1001m to the transmission planning function. In this case, the eNodeB therefore provides 1103 the MTC connection parameters comprised in the RRC connection request message 1001m to the transmission planning function of the eNodeB. The transmission planning function of the eNodeB determines 1104 one or multiple timeslots by combining application connectivity requirements with pre-determined network load profiles (e.g. a load profile 1000 of RAN and/or core network shown in FIG. 10), and a real time load status.

As shown in FIG. 10, for this purpose the eNodeB obtains network-wide load information from OSS or directly from core network nodes to determine the real time load status. Performance monitoring applications in OSS (continuously) monitor the load status of RAN and/or core network nodes and, based on the monitored results, OSS may generate different types of load descriptions for each monitored network node.

One load description generated by OSS and provided to the eNode B may be a network load profile which is based on the periodic characteristics of network load (both temporal and spatial). The OSS carries out statistical analysis on node loads (e.g. MMEs, S-GWs, P-GWs, etc.) at different timeslots and generates a load profile for a respective node. For example, OSS may use the load information of the past month, calculate hourly (average) load, and generate a simple daily load profile. OSS may further use data mining techniques to filter the outlier data and improve the accuracy of the generated load profiles.

Another load description that may be generated and provided by OSS is a real time load status updates. OSS may collect real time load information from network nodes loads (e.g. MMEs, S-GWs, P-GWs, etc.) and generates real time load reports, which may be periodically sent to interested nodes, e.g. the eNodeBs.

In the embodiment, OSS, as the major O&M (operational management) supporting system, transmits the generated load reports (load profile(s) 1000 and/or real time updates) to the eNodeB. The eNodeB uses the generated profile(s) for transmission planning upon receiving RRC connection requests from MTC devices. Note that it is also possible that the load reports described are generated and sent to the eNodeB by the corresponding network nodes (e.g. MMEs, P-GWs, S-GWs, etc.). However this option may require an extra signaling channel for each of the status reports, which increases the complexity of the system.

The transmission planning function in the eNodeB may maintain a load map for each network node in the network (e.g. MMEs, P-GWs, S-GWs, etc.). In one exemplary implementation, three types of information are recorded in the load map, including profiled (traffic) load, scheduled MTC (traffic) load and available capacity. The profiled load may be a load map from OSS on one or more monitored network nodes in the network. The profiled load may indicate the estimated load of a respective node at different points in time (timeslots). MTC (traffic) load is the expected load of a respective network node due to MTC data transmissions. Again the MTC (traffic) load may indicate the estimated load of a respective node at different points in time (timeslots). The profiled (traffic) load and/or MTC (traffic) load may be given in term of a device count for a respective timeslot in the load map.

When a new RRC connection request for MTC data transmission is received at the eNodeB, the transmission planning function tries to find the timeslot in the interval [T_0, T_0+ACCEPTABLE_LATENCY] with the least load, which satisfies the requirement of the MTC connection duration. Note that T_0 is the current timeslot or next timeslot in the future. The transmission planning function does not necessarily have to use a least-loaded-first algorithm (i.e. selecting the least loaded timeslots for the connectivity) for determining timeslots matching the MTC connection parameters. Also other algorithms can be used, such as for example earliest-available-first (i.e. selecting the earliest available timeslots for the connectivity), round-robin (i.e. the connectivity is assigned each empty/free timeslots in equal portions and in circular order (for example, the first connectivity in 9:00-9:05, the second in 9:05-9:10 . . . the 100th in 9:00-9:05)); weighted round robin, etc.

Note that instead of one timeslot, the transmission planning function could also determine multiple alternative timeslots meeting the MTC connection parameters.

In case no timeslot matching the MTC connection parameters was found in step 1104 (which leads to a no at the decision step 1105 in FIG. 11), the eNodeB may either reject 1110 the RRC connection request, which also leads to a termination of the RRC connection establishment procedure at the MTC device (see step 1507 in FIG. 15) or partly satisfy the connection requirement (see below).

In case the transmission planning function is able to successfully determine a timeslot in this given time interval [T_0, T_0+ACCEPTABLE_LATENCY] for which the maximum load count is not exceeding a given upper threshold (yes at the decision step 1105 in FIG. 11), the transmission planning function causes the eNodeB to transmit 1003 (FIG. 10), 1106 (FIG. 11) an indication of the determined one (or more) timeslot(s) to the MTC device through a RRC connection setup message 1003*m* (which is comparable to the connection setup message 803*m*). The RRC connection setup message 1003*m* has similar data structure with normal RRC Connection Setup/Rejection message. A difference is that it includes additional information on the one or more timeslots which have been determined for the MTC device. In one exemplary implementation, the RRC connection setup message 1003*m* could look like the message defined by the following ASN.1 syntax.

```
RRCConnectionSetup ::=           SEQUENCE {
    rrc-TransactionIdentifier        RRC-TransactionIdentifier,
    criticalExtensions               CHOICE {
        c1                               CHOICE {
            rrcConnectionSetup-r8            RRCConnectionSetup-r8-IEs,
            spare7 NULL,
            spare6 NULL, spare5 NULL, spare4 NULL,
            spare3 NULL, spare2 NULL, spare1 NULL
        },
        criticalExtensionsFuture         criticalExtensionsFuture-IEs
    }
}
RRCConnectionSetup-r8-IEs ::=    SEQUENCE {
    radioResourceConfigDedicated     RadioResourceConfigDedicated,
    nonCriticalExtension             RRCConnectionSetup-v8a0-IEs   OPTIONAL
}
```

```
RRCConnectionSetup-v8a0-IEs ::=  SEQUENCE {
    lateNonCriticalExtension        OCTET STRING            OPTIONAL, -- Need OP
    nonCriticalExtension            SEQUENCE { }            OPTIONAL  -- Need OP
}
criticalExtensionsFuture-IEs ::=   SEQUENCE {
    mtcSchedExtension               mtcSchedExtension-IEs,
}
mtcSchedExtension-IEs::=           SEQUENCE {
    mtcScheduledTimeSlot            mtcScheduledTimeSlot-IEs            OPTIONAL
}
mtcScheduledTimeSlot-IEs::=        SEQUENCE {
    schedStartingTime    TIMESTAMP,
    schedEndingTime      TIMESTAMP
}
```

The indication of the timeslot(s) determined by the transmission planning function of the eNodeB for the transmission of the MTC data gives the MTC device reliable connectivity timeslots (which may or may not guarantee the fulfillment of the connectivity).

When the RRC connection setup message 1003m is received 1502 by the MTC device, the MTC device's behavior may depend on the type of the RRC connection setup message (decision step 1503 in FIG. 15). In detail it depends on whether the eNodeB offers the MTC device to select a timeslot among multiple timeslots or not. In one exemplary implementation, the transmission planning function of the eNodeB determines 1104 only one single timeslot that fulfills the MTC connection parameters of the RRC connection request message 1001m. This timeslot is communicated 1003 (FIG. 10), 1106 (FIG. 11) in the RRC connection setup message 1003m from the eNodeB to the MTC device. In this case, the MTC device may only confirm the assigned timeslot by sending 1004 (FIG. 10), 1505 (FIG. 15) a (normal) RRC connection setup complete message 1004m to the eNodeB to confirm the assignment of the timeslot.

In another exemplary implementation the transmission planning function can determine 1104 multiple timeslots that fulfill the MTC connection parameters of the RRC connection request message 1001m. These timeslots are communicated 1003 (FIG. 10), 1106 (FIG. 11) in the RRC connection setup message 1003m from the eNodeB to the MTC device for accepting one of them. The MTC device selects 1504 one of the plural timeslots communicated by means of the RRC connection setup message 1003m, and accepts the selected timeslot by sending 1004 (FIG. 10), 1505 (FIG. 15) an RRC connection setup complete message 1004m. This RRC connection setup complete message 1004m (which can be compared to the connection setup complete message 805m) is enhanced by comprising an information field for indicating the accepted timeslot to the eNodeB. Note that the accepted timeslot is indicated as T2 in FIG. 10 for exemplary purposes only.

After receiving 1107 the RRC connection setup complete message 1004m from the MTC device, the eNodeB updates 1108 its load map accordingly, e.g. by incrementing the load count for the (accepted) timeslot as described herein above. This may include extracting the information field containing the indication of the accepted timeslot T2 and updating its load count accordingly. This step essentially ends the first modified RRC connection establishment procedure.

Note that in case the MTC device is not able to choose a timeslot, but has to accept the assigned timeslot in any case, the incrementing the load count for the determined (assigned) timeslot may also be performed by the transmission planning function of the eNodeB as part of the determination 1104.

Furthermore, it is noted that the transmission planning function of the eNodeB does not have to buffer/store the MTC connection parameters for the requesting MTC device. The transmission planning function can delete the MTC connection parameters locally after having determined the timeslot(s) or after receiving the RRC connection complete message 1004m with the accepted timeslot.

In a variation, the MTC device may have the possibility to reject the one or more timeslots determined by the transmission planning function of the eNodeB. In this case the RRC connection setup complete message 1004m comprises an indication that no timeslot has been accepted by the MTC device, optionally, together with the cause for the rejection.

Figure 12:
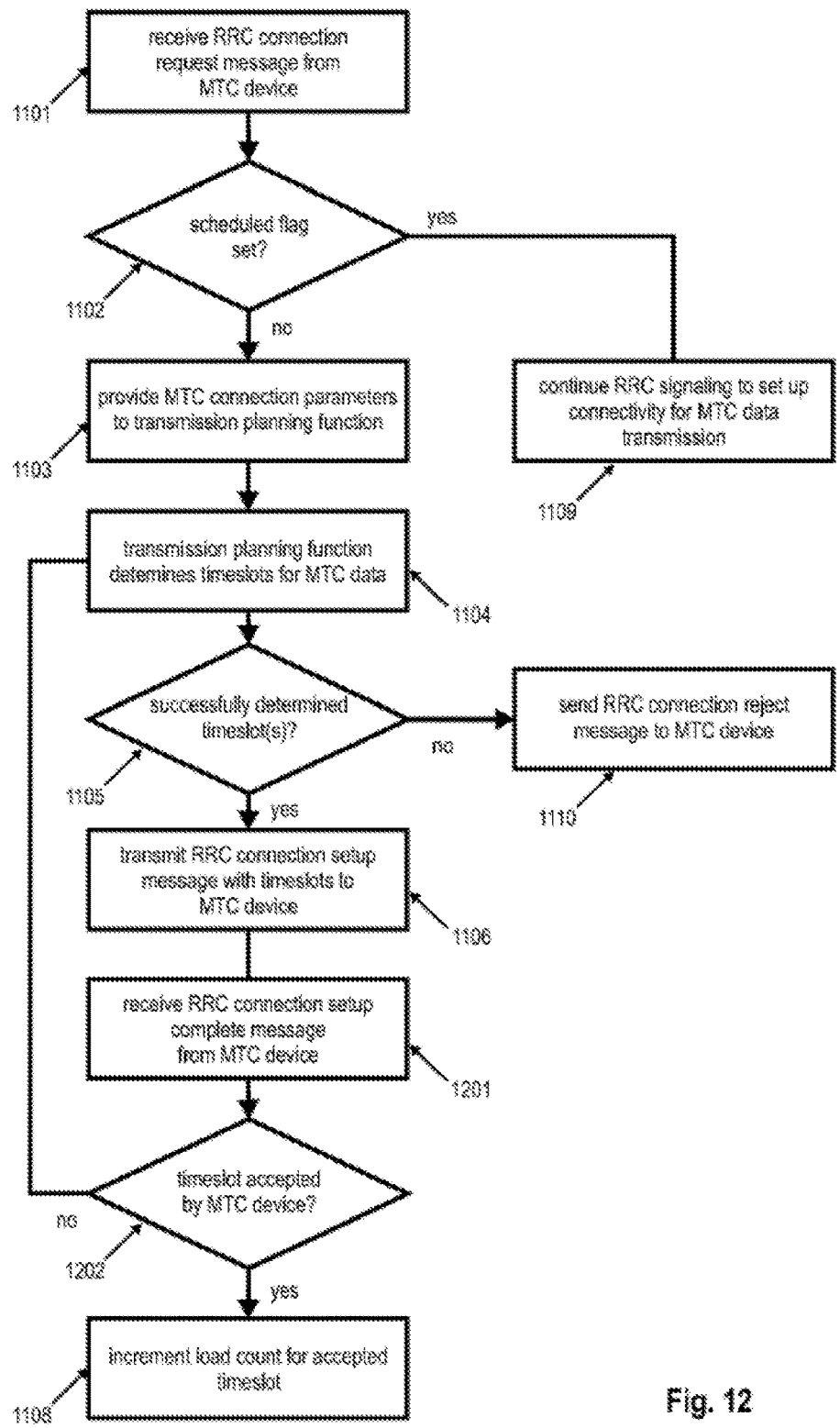

FIG. 12 shows another exemplary flow chart of the operation of the eNodeB with a modified RRC connection establishment procedure according to an exemplary embodiment. This modified RRC connection establishment procedure has been adapted to introduce the handling of the MTC device declining the initially assigned timeslot(s). As shown in FIG. 12, the eNodeB receives 1201 the connection complete message 1004m discussed before, and checks 1202 whether the connection complete message indicates an accepted timeslot. If this is the case, the RRC connection establishment procedure continues as discussed before. Otherwise the eNodeB invokes the transmission planning function again, which determines 1104 one or more alternative timeslots for the MTC data, which are suggested 1105 to the MTC device.

Returning to FIG. 10, upon reaching the accepted timeslot T2, the MTC device initiates another modified RRC connection establishment procedure. The MTC device transmits 1005 (FIG. 10), 1506 (FIG. 15) a further RRC connection requests message 1005m when reaching the assigned timeslot. As outlined above, the RRC connection request message 1005m has a scheduled flag, which is set by the MTC device to indicate that this connection request has been scheduled previously by the eNodeB. No MTC connection parameters need to be included in the RRC connection request message 1005 this time. The use of the scheduled flag may be advantageous, as it allows reducing the workload of the transmission planning function (as the eNodeB does not have to invoke the transmission planning function on request where the scheduled bit is set), and/or the use of the scheduled bit may reduce latency in establishing RRC connections.

The eNodeB receives 1101 the RRC connection request message 1005m and notes 1006 (yes at decision step 1102 in FIG. 11) that the scheduled flag is set. Accordingly, the eNodeB does not need to request the transmission planning function to perform transmission planning for the connection request by the MTC device. Instead the eNodeB continues 1109 the RRC connection establishment procedure 1007 (which is comparable to the connection setup and physical resource assignment 807) with the MTC device (1508 in FIG. 15) to setup and/or reserve the necessary resources for transmitting 1008 (FIG. 10), 1509 (FIG. 15) the MTC data 1008 in the RAN and core network. Such establishment procedure 1007 may also include the eNodeB causing the physical resource scheduler to assign physical resources in the RAN for transmission of MTC data via the air interface.

Figure 13:
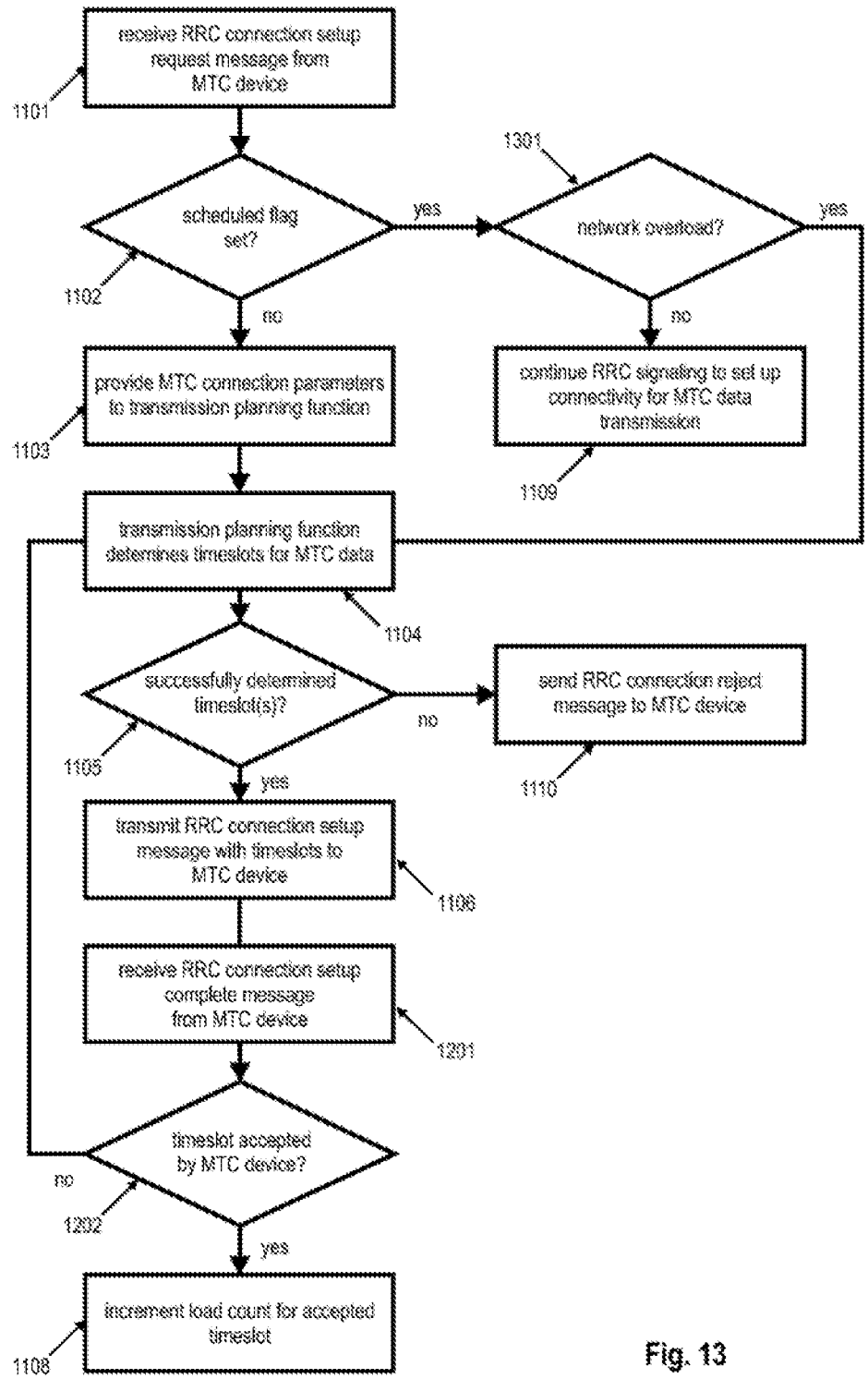
Figure 14:
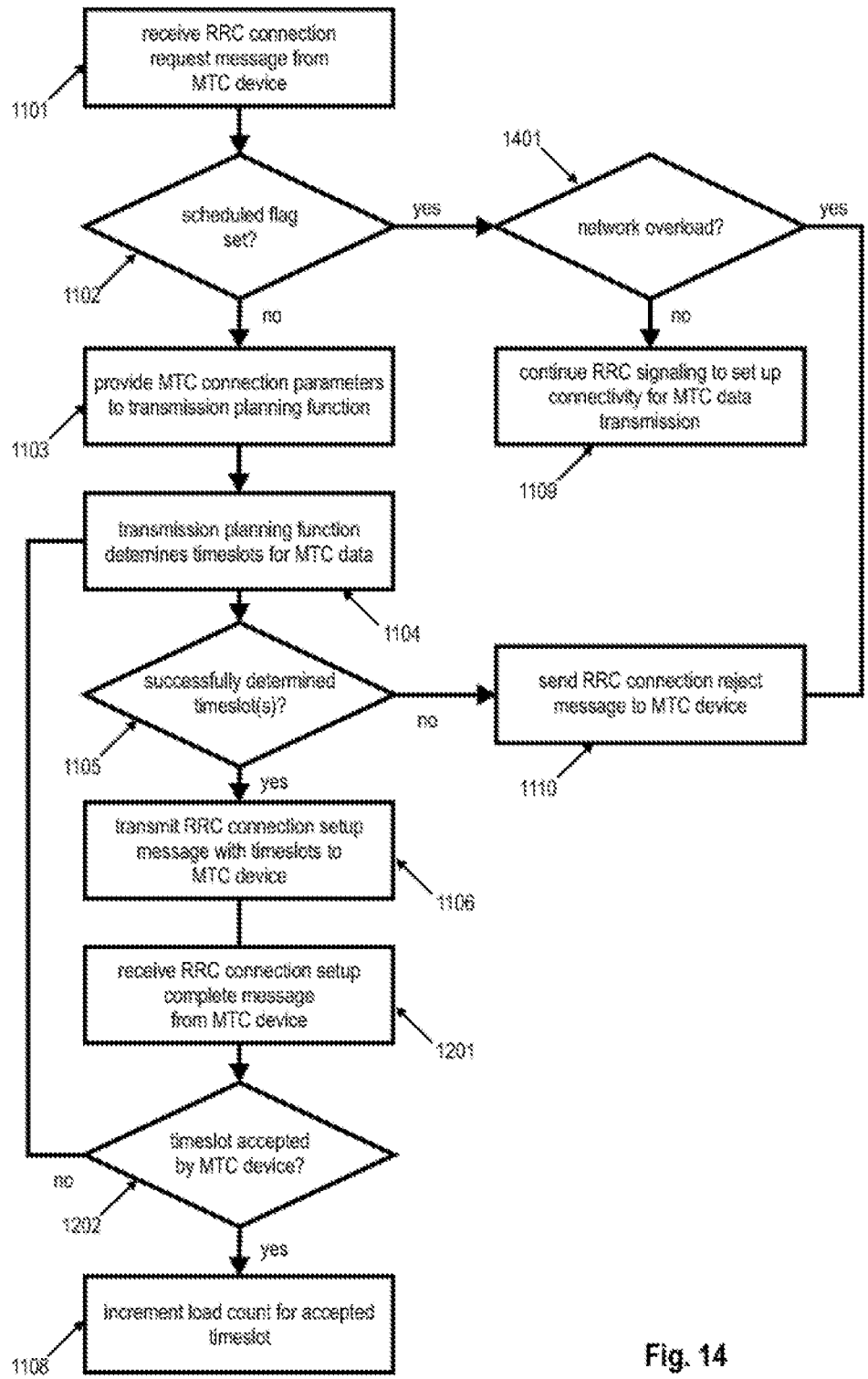

FIG. 13 and FIG. 14 each show a flow chart of the operation of the eNodeB in modified RRC connection establishment procedure according to an exemplary embodiments, which cope with failure handling in case a "scheduled" connection request cannot be served by the eNodeB. In these variations, upon receiving 1101, a RRC connection request message 1005m with the scheduled flag set at the eNodeB, the eNodeB may detect 1301 (FIG. 13), 1401 (FIG. 14) first, whether the connection request can be fulfilled in view of the current load situation in the network.

As noted, the eNodeB may check a real-time network load status to guarantee quality of network services. If any abnormality is detected (yes at decision step 1401), for example, overload caused by unexpected reasons, the eNodeB may reject 1110 (see FIG. 14) the RRC connection request by the MTC device, even though this connection request has been scheduled for the given timeslot by the transmission planning function. Optionally, the RRC connection reject message that is sent by the eNodeB to reject the connection request may be further enhanced by an information element that allows signaling of an extended wait time, as proposed in existing 3GPP MTC enhancements for RRC messages (see section 6.2.2. of 3GPP TS 36.331), i.e. a time duration the MTC device has to wait before initiating the next RRC connection request procedure.

The variation of the eNodeB behavior as shown in FIG. 13 is intended to avoid a rejection of the connection request, in case the connection request cannot be fulfilled in view of the current load situation in the network. In case a RRC connection request in which a scheduled flag is set cannot be fulfilled (yes at decision step 1301) in view of the current load situation in the network, the eNodeB doesn't reject the RRC connection request. Instead, the eNodeB again invokes the transmission planning function to determine 1104 other candidate timeslot(s) for transmission of the MTC data. If such renegotiation functionality is implemented, it may be desirable that also RRC connection setup messages where the scheduled flag is set comprise (updated) MTC connection parameters for the MTC data. In case the transmission planning function does not buffer the MTC connection parameters of the first RRC connection setup message from the MTC device, (updated) MTC connection parameters could be used by the transmission planning function in determining 1104 new timeslot(s) for the transmission of the MTC data. Optionally, the MTC device may be assigned a higher scheduling priority in transmission planning in case of renegotiation In the manner described before, the eNodeB adds information on the newly determined timeslot(s) in the RRC connection setup message 1003m sent to the MTC device.

In another alternative implementation of such renegotiation functionality, the eNodeB may send the information on the newly determined timeslot(s) for the transmission of the MTC data already in the RRC connection reject message.

In the embodiments discussed in connection with FIGS. 10 to 15 before, it has been assumed for exemplary purposes that the MTC device adds MTC connection parameters for sending the MTC data to the (first) RRC connection request sent to eNodeB. In another embodiment, the MTC device does not include MTC connection parameters in its RRC connection requests. Instead, the eNodeB may only learn from the RRC connection request (e.g. based on an MTC device's identifier in the RRC connection request, such as a S-TMSI) that the requesting UE is a MTC device and may invoke the transmission planning function to determine 1104 one or more timeslots for the transmission of the MTC data for requesting MTC device in the same fashion as discussed in connection with FIGS. 10 to 15 above, except for the transmission planning function having less accurate information on the MTC data to be transmitted. In this case, it may be advantageous if the transmission planning function determines 1104 multiple timeslots that are proposed 1106 to the MTC device in a RRC connection setup message 1003m, and the MTC device selects and accepts 1504 one of the offered timeslots by sending 1505 a RRC connection setup complete message 1004m indicating the accepted timeslot to the eNodeB (or rejecting all timeslots) as discussed above.

Figure 16:
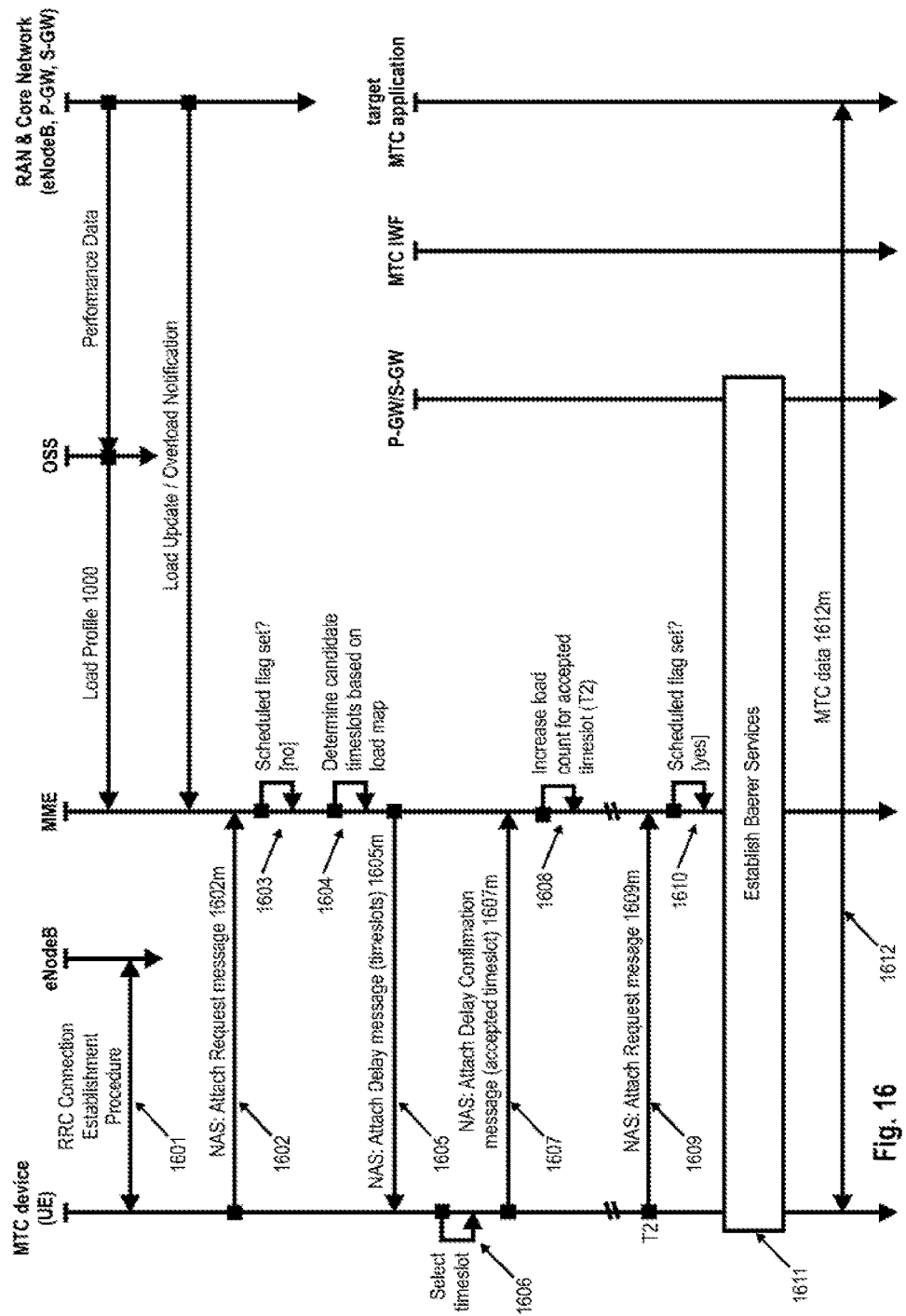
FIG. 16 shows an exemplary flow of NAS messages exchanged between the network node and the mobile terminal (MTC device) for controlling transmission of MTC data according to an exemplary embodiment.

Another embodiment suggests an alternative implementation, which essentially differs from the previous exemplary embodiments and their implementations by using NAS signaling messages (or any other signaling messages), instead of RRC signaling. FIG. 16 shows an exemplary flow of NAS messages (and other signaling messages) exchanged between the MME and the mobile terminal (MTC device) for controlling transmission of MTC data according to an exemplary embodiment. The signaling procedure is very similar to the one discussed with respect to FIG. 10 above, so that so that the above discussion with respect to RRC signaling analogously applies to the NAS signaling procedure in FIG. 16.

According to the procedure shown in FIG. 16, the MTC device first establishes an RRC connection with the eNodeB through a conventional RRC connection establishment procedure 1601, as for example known from 3GPP TS 36.331. Upon completion of an RRC connection, the MTC devices initiates the setup of a PDN connection by sending 1602 a NAS Attach Request message 1602m which includes the MTC connection parameters to its MME. The NAS Attach Request message 1602m may also comprise a scheduled flag, which is not set in this initial NAS Attach Request message 1602m. The MME checks 1603 the NAS Attach Request message 1602m for the scheduled flag being set. As the scheduled flag is not set, it notifies the transmission planning function of the MME on the MTC connection parameters, which thereupon determines 1604 one or more timeslots for the transmission of MTC data based on the network load status in the manner described before in connection with FIGS. 10 to 14. The network load status may include the MME's own load status and the load status of P-GW and S-GW.

The determined one or more timeslots are sent 1605 to the MTC device in an NAS Attach Delay message 1605m, comprising an information on the determined timeslots. The MTC device selects/accepts 1606 one of the one or more timeslots comprised in the received NAS Attach Delay message 1605m, and indicates 1607 the accepted timeslot (in the example timeslot T2) to the MME in a NAS Attach Delay Confirmation message 1607m. The MME updates 1608 the load map (i.e. the load count for the accepted timeslot) thereby finishing the signaling procedure.

Upon reaching the accepted timeslot, the MTC device sends 1609 another NAS Attach Request message 1609*m* this time with the scheduled flag being set. The MME receives the NAS Attach Request message 1609*m* and recognizes 1610 the scheduled flag being set therein. The MME therefore continues with establishing 1611 the bearer services in RAN and the core network to convey 1612 the MTC data 1612*m*.

In case the NAS signaling procedure shown in FIG. 16 is implemented in a 3G network, the MME would correspond to the SGSN.

Figure 17:
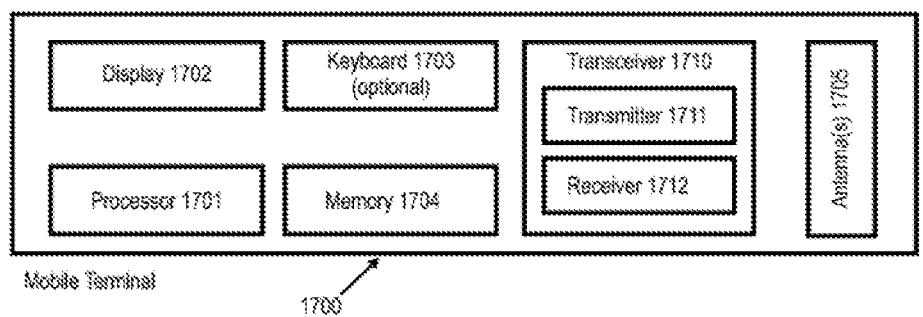
FIG. 17 shows a mobile terminal (MTC device) according to an exemplary embodiment.

A further embodiment provides a mobile terminal 1700 as exemplarily shown in FIG. 17. This mobile terminal comprises a transceiver 1710, which has a transmitter 1711 and a receiver 1712. The transmitter 1711 is configured to transmit, in the control plane, a connection request message to a network node in the radio access network or in the core network of a mobile communication system. The connection request message requests the establishment of a connection and indicates that the requesting mobile terminal is a MTC device. The receiver 1712 is configured to receive, in the control plane and from the network node, a first connection setup message. The first connection setup message informs the mobile terminal on one or more determined timeslots for transmitting the MTC data.

The transmitter 1711 is further configured to transmit, in response to the first connection setup message and in the control plane, a connection setup complete message to the network node accepting one of the one or more determined timeslots. The transmitter 1711 is also configured to transmit in the control plane and upon reaching the point in time of the accepted one timeslot, a second connection request message to the network node to establish a connection for transmitting the MTC data.

The mobile terminal 1700 further comprises a processor 1701 configured to check whether one of the timeslot(s) indicated in the first connection setup message allows for transmission of the MTC data within a maximum latency constraint for transmitting the MTC data. Moreover, the transmitter 1711 is configured to indicate an accepted one of the determined timeslot(s) in the connection setup complete message, in case one of the determined timeslot(s) allows for transmission of the MTC data within the maximum latency constraint for transmitting the MTC data. The transmitter 1711 is further configured to indicate declining of all determined timeslots in the connection setup complete message, in case none of the determined timeslot(s) allows for transmission of the MTC data within the maximum latency constraint for transmitting the MTC data.

The processor 1701 may be further used to select and accept one of the timeslots suggested for MTC data transmission to the mobile terminal. Furthermore, the processor 1701 may control the display of information on an (optional) display 1702 of the mobile terminal and may process inputs that may be received via an (optional) keyboard 1703. The mobile terminal may also have one or more antennas 1705 for transmitting user plane and control plane data to a network node, such as a base station, as discussed herein.

Figure 18:
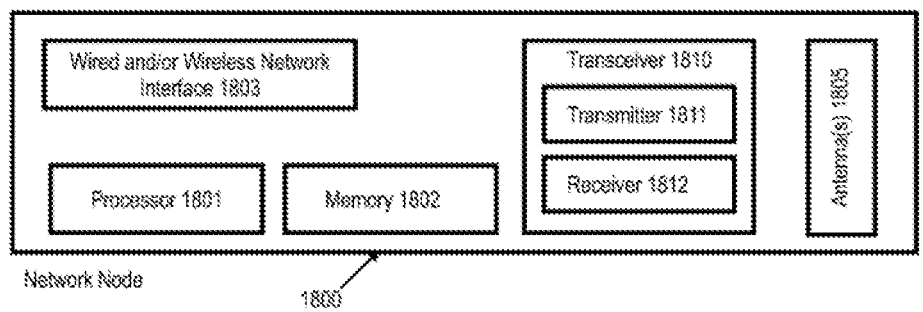
FIG. 18 shows a network node (e.g. base station, mobility management unit, etc.) according to an exemplary embodiment.

Another embodiment relates to a network node 1800 as exemplarily shown in FIG. 18 for controlling transmission of MTC data to or from MTC devices within a mobile communication system. The network node 1800 may be a network node for use in the radio access network or for use in the core network of the mobile communication system.

The network node comprises a transceiver 1810, which has a transmitter 1811 and a receiver 1812. The receiver 1812 is configured to receive a first connection request message in the control plane from a mobile terminal (such as the mobile terminal 1700), wherein the first connection request message requests the establishment of a connection between the network node 1800 and the mobile terminal, and indicates that the requesting mobile terminal is a MTC device. The network node 1800 may further comprise a processor 1801 which is configured to determine timeslot(s) for transmitting the MTC data based on load information that indicate the estimated load of the mobile communication system at different future timeslots including the one or more determined timeslots. The timeslot(s) determined by the processor 1801 are timeslots for which a maximum load count has not been reached.

Further, the transmitter 1811 may be configured to transmit, in the control plane and to a mobile terminal, a first connection setup message, wherein the first connection setup message informs the mobile terminal on the one or more determined timeslots for transmitting the MTC data.

The processor 1801 is configured to execute any functionality that requires computation, such as for example the computations for implementing the transmission planning function, including the determination of timeslots for MTC data transmission based on certain load information and MTC connection parameters, the update of the load information, the generation of signaling messages, etc. The network node may also comprise a memory 1802 to permanently or temporarily store information, such as MTC connection parameters of requesting MTC devices, load information, etc. Furthermore, the network node may also comprise a wired interface and/or wireless interface that allows for connecting to other network nodes in the mobile communication system, e.g. OSS.

Optionally the network node 1800 may also have one or more antennas 1805 for transmitting and receiving data via the air.

Furthermore, the network node 1800 may be implemented as a base station for use in the radio access network of the mobile communication system, or alternatively as a mobility management entity for use in the core network of the mobile communication system. However, the network node is not limited to these two examples.

It should be noted that the basic mechanism proposed herein can also be used for non-MTC devices which allow delay tolerant connectivity. For example, some applications running inside smart phones may initiate machine-to-machine type communication (such as a social media content app pushing non-real-time updates towards social media content servers).

Moreover, the basic mechanism proposed herein may also be used in fixed networks where terminals and applications allow delay tolerant connectivity.

It should be further noted that the individual features of the different embodiments of the aspects discussed herein may individually or in arbitrary combination be subject matter to another invention.

Although some aspects have been described in the context of a method, it is clear that these aspects also represent a description of the corresponding apparatus suitably adapted to perform such method. In such apparatus a (functional or tangible) block or device may correspond to one or more method step or a feature of a method step. Analogously, aspects described in the context of a corresponding block or item or feature of a corresponding apparatus may also correspond to individual method steps of a corresponding method.

Furthermore, the methods described herein may also be executed by (or using) a hardware apparatus, like a processor, microprocessor, a programmable computer or an electronic circuit. Some one or more of the most important method steps may be executed by such an apparatus. Where an apparatus has been described herein in terms of functional elements, e.g. processing unit, receiving unit, transmitter unit, or the like, it should be further understood that those elements of the apparatus may be fully or partly implemented in hardware elements/circuitry. Individual hardware, like a processor or microprocessor, a transmitter circuitry, receiver circuitry, etc., may be used to implement the functionality of one or more elements of the apparatus.

In addition, where information or data is to be stored in the process of implementing a method step of functional element of an apparatus in hardware, the apparatus may comprise memory or storage medium, which may be communicatably coupled to one or more hardware elements/circuitry of the apparatus.

It is also contemplated implementing the aspects of the invention in in hardware or in software or a combination thereof. This may be using a digital storage medium, for example a floppy disk, a DVD, a Blu-Ray, a CD, a ROM, a PROM, an EPROM, an EEPROM or a FLASH memory, having electronically readable control signals or instructions stored thereon, which cooperate (or are capable of cooperating) with a programmable computer system such that the respective method is performed. A data carrier may be provided which has electronically readable control signals or instructions, which are capable of cooperating with a programmable computer system, such that the method described herein is performed.

It is also contemplated implementing the aspects of the invention in the form of a computer program product with a program code, the program code being operative for performing the method when the computer program product runs on a computer. The program code may be stored on a machine readable carrier.

The above described is merely illustrative, and it is understood that modifications and variations of the arrangements and the details described herein will be apparent to others skilled in the art. It is the intent, therefore, to be limited only by the scope of the impending claims and not by the specific details presented by way of description and explanation above.

What is claimed is:

1. A method for controlling transmission of machine type communication data to or from machine type communication devices within a mobile communication system, wherein the method comprises: receiving, by a network node in a radio access network or core network of the mobile communication system, a first connection request message in a control plane from a mobile terminal, wherein the first connection request message requests establishment of a connection between the network node and the mobile terminal for transmitting timeslot information, indicates that the mobile terminal is a machine type communication device and includes a connectivity duration field indicating an estimated connectivity duration for transmitting machine type communication data per connection request; receiving, by the network node, load information that either indicates an estimated load of the mobile communication system at different future timeslots or provides real time load information from which the estimated load can be determined; determining, by the network node, future timeslots for transmitting machine type communication data based on the load information and the first connection request message, including the connectivity duration field, wherein the determined future timeslots are one or more timeslots for which a maximum load count has not been reached; transmitting, by the network node, in the control plane and to the mobile terminal, a first connection setup message that informs the mobile terminal regarding the determined future timeslots; receiving, in response to the first connection setup message and in the control plane, a connection setup complete message from the mobile terminal accepting one of the determined future timeslots; and increasing a load count for the accepted timeslot in response to receiving the connection setup complete message.

2. The method according to claim 1, wherein the first connection request message comprises, and determining the one or more timeslots is further based on, at least one of a latency field for indicating a maximum latency for transmitting machine type communication data; and a frequency field for indicating a frequency of transmission of machine type communication data.

3. The method according to claim 1, wherein the method further comprises: receiving, in one of the determined one or more timeslots, a second connection request message in the control plane from the mobile terminal, the second connection request message requesting the network node to establish a connection for transmitting machine type communication data.

4. The method according to claim 3, wherein the second connection request message comprises a scheduled flag, wherein the scheduled flag indicates to the network node that the mobile terminal has previously been assigned to the one of the determined one or more timeslots.

5. The method according to claim 3, wherein in case of network overload in the mobile communication system upon reception of the second connection request message, the method further comprises: determining further future timeslots for transmitting machine type communication data, wherein the determined further future timeslots are timeslots or which a maximum load count has not been reached and the determination is based on load information that indicates estimated load of the mobile communication system at different future timeslots including the determined further future timeslots; and transmitting, in the control plane and to the mobile terminal, a second connection setup message, wherein the second connection setup message informs the mobile terminal regarding the determined further future timeslots for transmitting machine type communication data.

6. The method according to claim 5, further comprising: receiving, in response to the second connection setup message and in the control plane, another connection setup complete message from the mobile terminal accepting one of the determined further future timeslots; and increasing a load count for the accepted timeslot of the determined further future timeslots in response to receiving the another connection setup complete message.

7. A network node for controlling transmission of machine type communication data to or from machine type communication devices within a mobile communication system, wherein the network node comprises:
   a processor;
   a receiver configured to cooperate with the processor to receive a first connection request message in a control plane from a mobile terminal and receive load information that either indicates an estimated load of the mobile communication system at different future timeslots or provides real time load information from which the estimated load can be determined, wherein the first connection request message requests establishment of a connection between the network node and the mobile terminal indicates that the mobile terminal is a machine type communication device and includes a connectivity duration field indicating an estimated connectivity duration for transmitting machine type communication data per connection request;

the processor configured to determine future timeslots for transmitting machine type communication data based on the load information and the first connection request message and load information, including the connectivity duration field, wherein the determined future timeslots are one or more timeslots for which a maximum load count has not been reached;

a transmitter configured to cooperate with the processor to transmit, in the control plane and to the mobile terminal, a first connection setup message, that informs the mobile terminal regarding the determined future timeslots for transmitting machine type communication data, wherein the receiver is further configured to receive, in response to the first connection setup message and in the control plane, a connection setup complete message from the mobile terminal accepting one of the determined future timeslots, and wherein the processor is further configured to increase a load count for the accepted timeslot in response to receiving the connection setup complete message.

8. A non-transitory computer-readable medium having processor-executable instructions stored thereon, the processor-executable instructions, when executed, facilitating performance of the fallowing operations:

receiving a first connection request message in a control plane from a mobile terminal, wherein the first connection request message requests establishment of a connection between a network node and the mobile terminal, indicates that the mobile terminal is a machine type communication device and includes a connectivity duration field indicating an estimated connectivity duration for transmitting machine type communication data per connection request;

receiving load information that either indicates an estimated load of a mobile communication system at different future timeslots or provides real time load information from which the estimated load can be determined;

determining future timeslots for transmitting machine type communication data based on the load information and the first connection request message, including the connectivity duration field, wherein the determined future timeslots are one or more timeslots for which a maximum load count has not been reached, transmitting, in the control plane and to the mobile terminal, a first connection setup message that informs the mobile terminal regarding the determined future timeslots for transmitting machine type communication data;

receiving, in response to the first connection setup message and in the control plane, a connection setup complete message from the mobile terminal accepting one of the determined future timeslots; and increasing a load count for the accepted timeslot in response to receiving the connection setup complete message.

* * * * *

UNITED STATES PATENT AND TRADEMARK OFFICE
CERTIFICATE OF CORRECTION

| | | |
|---|---|---|
| PATENT NO. | : 10,455,386 B2 | Page 1 of 1 |
| APPLICATION NO. | : 15/152310 | |
| DATED | : October 22, 2019 | |
| INVENTOR(S) | : Yangcheng Huang | |

It is certified that error appears in the above-identified patent and that said Letters Patent is hereby corrected as shown below:

In the Claims

Claim 5, Column 30, Line 41: "timeslots or which a maximum load count has not been" should read -- timeslots for which a maximum load count has not been --.

Claim 8, Column 31, Line 36: "formance of the fallowing operations:" should read -- formance of the following operations: --.

Signed and Sealed this
Fourteenth Day of September, 2021

Drew Hirshfeld
*Performing the Functions and Duties of the*
*Under Secretary of Commerce for Intellectual Property and*
*Director of the United States Patent and Trademark Office*